(12) United States Patent
Gold et al.

(10) Patent No.: US 10,297,379 B2
(45) Date of Patent: May 21, 2019

(54) INTEGRATED TRANSFORMERS AND COUPLED INDUCTORS AND ASSOCIATED SYSTEMS AND METHODS

(71) Applicant: Maxim Integrated Products, Inc., San Jose, CA (US)

(72) Inventors: Sean Philip Gold, Sunnyvale, CA (US); Alexandr Ikriannikov, Castro Valley, CA (US); Milan Dragojevic, West Roxbury, MA (US); Michael D. McJimsey, Danville, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 15/456,011

(22) Filed: Mar. 10, 2017

(65) Prior Publication Data

US 2017/0263369 A1   Sep. 14, 2017

Related U.S. Application Data

(60) Provisional application No. 62/306,901, filed on Mar. 11, 2016.

(51) Int. Cl.
*H02M 3/335* (2006.01)
*H01F 27/24* (2006.01)
(Continued)

(52) U.S. Cl.
CPC .............. *H01F 27/24* (2013.01); *H01F 3/12* (2013.01); *H01F 27/2823* (2013.01);
(Continued)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS 6,362,986 B1  3/2002  Schultz et al.
6,765,810 B2  7/2004  Perry
(Continued)

FOREIGN PATENT DOCUMENTS

JP    H076314     1/1995
JP    H07230606   8/1995
WO    2016022966 A1  2/2016

*Primary Examiner* — Bryan R Perez
(74) *Attorney, Agent, or Firm* — Lathrop Gage LLP

(57) ABSTRACT

A switching power converter includes an integrated transformer and coupled inductor, first and second primary switching circuits, and a master controller. The integrated transformer and coupled inductor includes (a) first and second primary windings electrically coupled in series and (b) first and second secondary windings. The first and second primary switching circuits are electrically coupled to an end of the first primary winding and an end of the second primary winding, respectively. The master controller is configured to determine a magnitude of magnetizing current of the integrated transformer and coupled inductor from a difference between magnitude of current flowing through the first secondary winding and magnitude of current flowing through the second secondary winding, when the first and second primary switching circuits are in their respective off-states.

19 Claims, 21 Drawing Sheets

(51) Int. Cl.
*H01F 27/28* (2006.01)
*H01F 27/32* (2006.01)
*H02M 1/40* (2007.01)
*H01F 3/12* (2006.01)
*H01F 38/08* (2006.01)
*H02M 1/00* (2006.01)

(52) U.S. Cl.
CPC ........... *H01F 27/324* (2013.01); *H01F 38/08* (2013.01); *H02M 1/40* (2013.01); *H02M 3/33576* (2013.01); *H02M 2001/0064* (2013.01)

(58) Field of Classification Search
CPC ......... H02M 3/33507; H02M 3/33592; H02M 3/33523; H02M 3/3353; H02M 3/33569; H02M 5/40; H02M 5/42; H02M 5/44; H02M 5/443; H02M 5/45; H02M 5/4505; H02M 5/451; H02M 5/452; H02M 5/458; H02M 5/4585; H02M 2001/0064; H02M 1/40; H01F 27/24; H01F 27/324; H01F 27/2823; H01F 38/08; H01F 3/12
USPC .......... 336/83, 170, 212–215, 221, 178, 184
See application file for complete search history.

(56) References Cited

U.S. PATENT DOCUMENTS

| | | | |
|---|---|---|---|
| 6,873,237 B2 | 3/2005 | Chandrasekaran et al. | |
| 7,046,523 B2 | 5/2006 | Sun et al. | |
| 7,280,026 B2 | 10/2007 | Chandrasekaran et al. | |
| 7,352,269 B2 | 4/2008 | Li et al. | |
| 7,417,875 B2 | 8/2008 | Chandrasekaran et al. | |
| 7,633,369 B2 | 12/2009 | Chandrasekaran et al. | |
| 7,965,165 B2 | 6/2011 | Ikriannikov et al. | |
| 8,102,233 B2 | 1/2012 | Ikriannikov et al. | |
| 8,134,443 B2 | 3/2012 | Chandrasekaran et al. | |
| 8,294,544 B2 | 10/2012 | Ikriannikov et al. | |
| 8,975,995 B1* | 3/2015 | Ikriannikov | H01F 3/10 336/200 |
| 2014/0049351 A1* | 2/2014 | Carsten | H01F 3/12 336/213 |
| 2014/0247627 A1* | 9/2014 | Louvel | H02M 3/33592 363/21.03 |
| 2015/0263632 A1* | 9/2015 | Hirano | H02M 3/33546 363/17 |

* cited by examiner

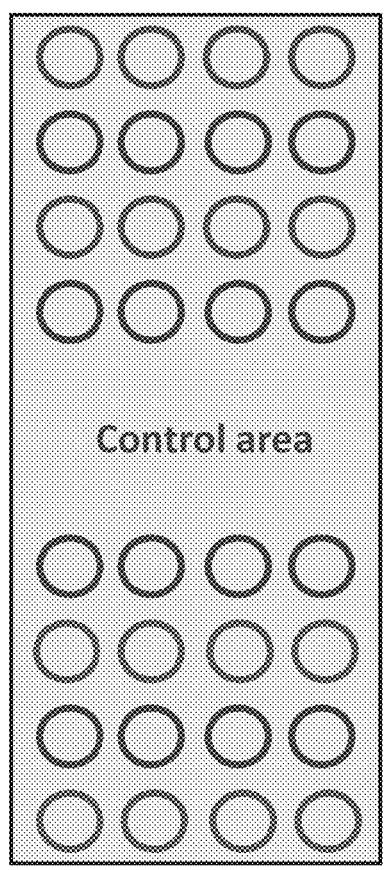 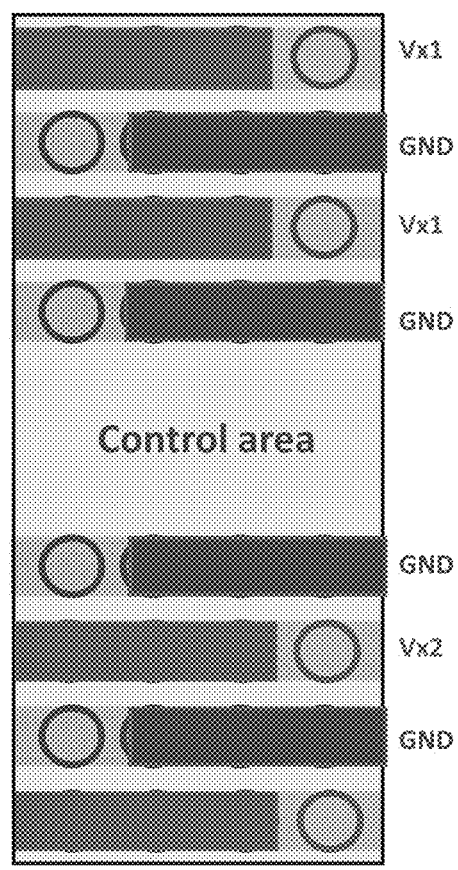
*FIG. 22*  *FIG. 23*

INTEGRATED TRANSFORMERS AND COUPLED INDUCTORS AND ASSOCIATED SYSTEMS AND METHODS

RELATED APPLICATIONS

This application claims benefit of priority to U.S. Provisional Patent Application Ser. No. 62/306,901, filed Mar. 11, 2016, which is incorporated herein by reference.

BACKGROUND

Switching power converters typically include one or more magnetic devices, such as inductors and/or transformers. Inductors store energy and are often used in switching power converters for filtering purposes. Similarly, transformers are typically designed to transfer energy in switching power converters, and achieve galvanic isolation and/or transform voltage magnitude.

It is known that a single coupled inductor can replace multiple discrete inductors in a switching power converter, to improve converter performance, to reduce converter size, and/or to reduce converter cost. Examples of coupled inductors and associated systems and methods are found in U.S. Pat. No. 6,362,986 to Schultz et al., which is incorporated herein by reference.

One known switching power converter is the current doubler. As known in the art, a current doubler includes a transformer and at least two inductors. The inductors can be implemented by a coupled inductor, and the coupled inductor can be combined with the transformer, so that all core magnetic devices of the current doubler are implemented in a single physical package.

FIG. 1 schematically illustrates a prior art current doubler 100 including an integrated transformer and coupled inductor 102, hereinafter referred to as "integrated magnetic device 102." Integrated magnetic device 102 includes a first primary winding 104, a second primary winding 106, a first secondary winding 108, a second secondary winding 110, and a magnetic core 111. First primary winding 104 and second primary winding 106 are electrically coupled in series. One end of first primary winding 104 is electrically coupled to a first primary switching circuit 112 via a blocking capacitor 114, and one end of second primary winding 106 is electrically coupled to a second primary switching circuit 116. Blocking capacitor 114 helps prevent magnetic saturation of the transformer of integrated magnetic device 102 by charging to a voltage that causes direct current (DC) through first and second primary windings 104 and 106 to be zero. Each primary switching circuit 112 and 116 is electrically coupled between a positive input power node 118 and a negative input power node 120.

One end of each secondary winding 108 and 110 is electrically coupled to a positive output power node 122. The other end of each secondary winding 108 and 110 is electrically coupled to a negative output power node 124 via a respective switching device 126 and 128. First and second primary switching circuits 112 and 116 operate under the command of a controller 130 to transfer power from an input power source 132 to a load 134, as known in the art.

Magnetic saturation of integrated magnetic device 102 can also be prevented by using cycle-by-cycle primary-side current mode control, where controller 130 controls operation of current doubler 100 so that peak magnitude of current through primary windings 104 and 106 is the same in successive switching cycles applying alternating polarity voltage to the primary windings, thereby preventing ramping up of magnetizing current and resulting magnetic saturation. Blocking capacitor 114 can therefore be omitted in cases where controller 130 implements primary-side current mode control.

However, cycle-by-cycle primary-side current mode control may not prevent magnetic saturation of integrated magnetic device 102 when current doubler 100 is powering a high-frequency transient load. For example, consider a scenario where current doubler 100 is powering a transient load having a load step frequency similar to the switching frequency of current doubler 100, and assume that there is a decrease in load between successive first and second switching cycles. Controller 130 will increase switching duty cycle in the second switching cycle to compensate for the load decrease, so that peak current in integrated magnetic 102 in the second switching cycle is the same as that in the first switching cycle. This disparity between duty cycles of the first and second switching cycles, however, will cause magnetic flux imbalance in integrated magnetic device 102, potentially resulting in magnetic saturation.

Additionally, conventional secondary-side current mode control will not prevent a DC component from developing in current through first and second primary windings 104 and 106. Thus, conventional secondary-side current mode control will not prevent the transformer of integrated magnetic device 102 from saturating.

FIG. 2 illustrates integrated magnetic device 102. Integrated magnetic device 102 has a "ladder" configuration and includes rails 202 and 204, rungs 206 and 208, and a gapped leakage post 210. Rungs 206 and 208 and leakage post 210 are each disposed between rail 202 and rail 204. First primary winding 104 and first secondary winding 108 are wound around rung 206, and second primary winding 106 and second secondary winding 110 are wound around rung 208. Dashed line 212 illustrates the approximate coupling magnetic flux path within integrated magnetic device 102, where coupling magnetic flux is magnetic flux that links both secondary windings 108 and 110. Dashed line 214 illustrates the approximate leakage magnetic flux path of first secondary winding 108, where leakage magnetic flux of first secondary winding 108 is magnetic flux that links first secondary winding 108 but does not link second secondary winding 110. Dashed line 216 illustrates the approximate leakage magnetic flux path of second secondary winding 110, where leakage magnetic flux of second secondary winding 110 is magnetic flux which links second secondary winding 110 but not first secondary winding 108.

Integrated magnetic devices have been proposed in U.S. Pat. No. 7,417,875 to Chandrasekaran et al. (Chandrasekaran '875). The windings of these integrated magnetic devices extend outside of the magnetic core, and therefore, these integrated magnetic devices are prone to generate significant fringing magnetic flux, which may cause undesirable losses and electromagnetic interference. Additionally, Chandrasekaran 875's devices may be difficult to manufacture because the magnetic core blocks access to opposing sides of the windings during winding installation. Furthermore, Chandrasekaran 875's illustrated devices have relatively long coupling magnetic flux paths between some of the windings, which potentially results in large magnetic core losses. U.S. Pat. Nos. 6,873,237; 7,046,523; 7,280,026; 7,633,369; and 8,134,443 disclose magnetic devices similar to those of Chandrasekaran '875.

BRIEF DESCRIPTION OF THE DRAWINGS

FIG. 22 illustrates another possible pinout of the slave controller of the FIG. 18 switching power converter.

FIG. 23 illustrates yet another possible pinout of the slave controller of the FIG. 18 switching power converter.

DETAILED DESCRIPTION OF THE EMBODIMENTS

Applicant has developed integrated transformers and coupled inductors which achieve significant advantages over conventional integrated magnetic devices. Certain embodiments of the integrated transformers and coupled inductors have shorter coupling magnetic flux paths and/or smaller footprints than conventional devices. The new integrated transformers and coupled inductors also promote (a) strong coupling of primary and secondary windings, (b) minimal fringing magnetic flux, and (c) ease of manufacture.

Figure 3:
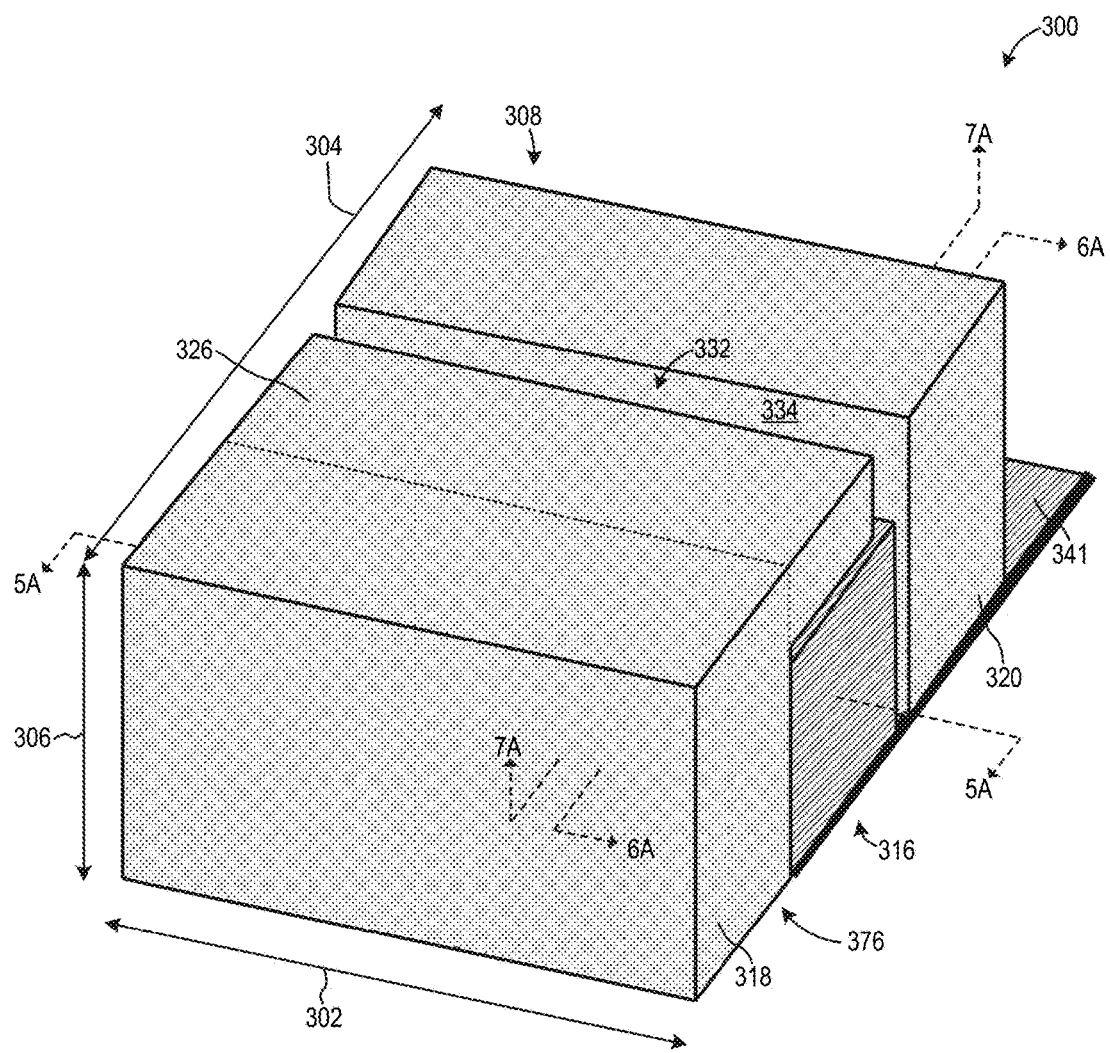
FIG. 3 is a perspective view of an integrated transformer and coupled inductor, according to an embodiment.
Figure 4:
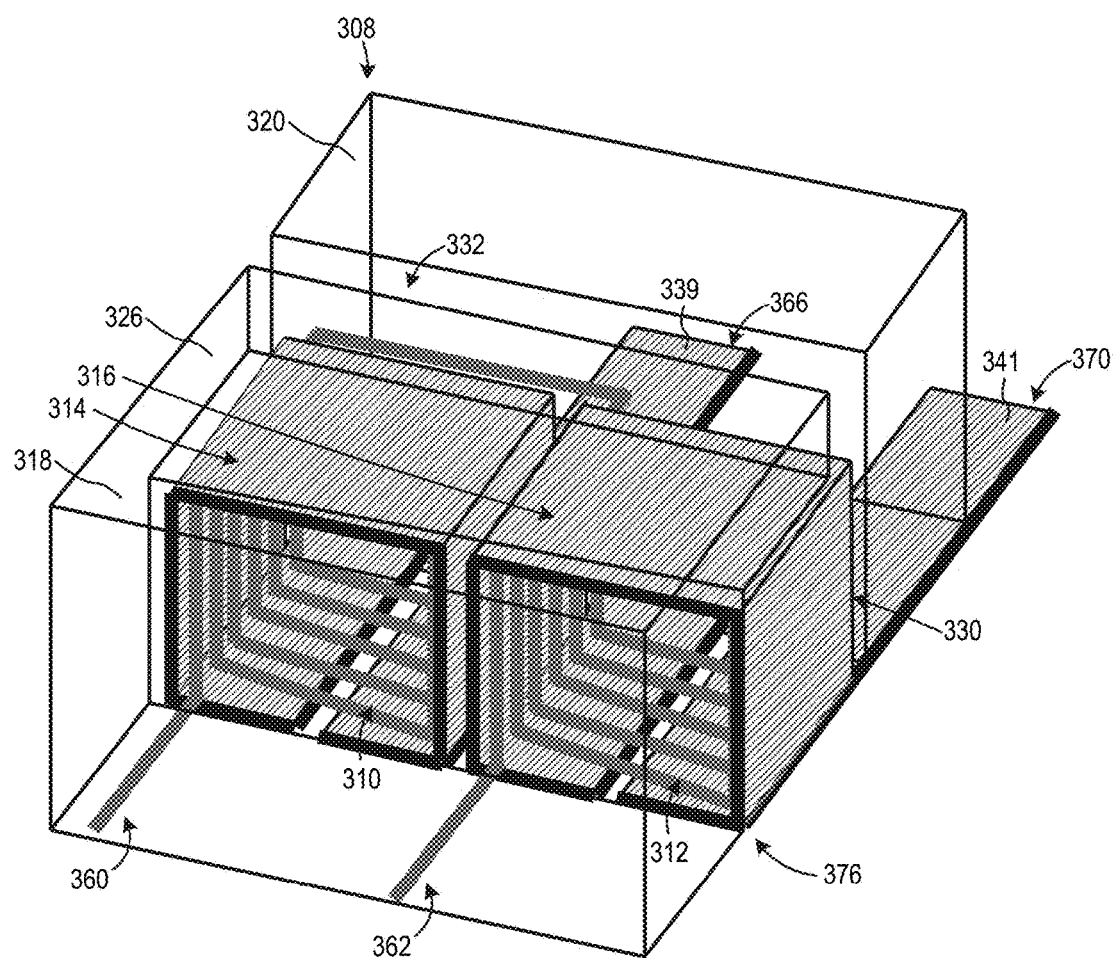
FIG. 4 is a perspective view of the integrated transformer and coupled inductor of FIG. 3 with the magnetic core shown in wire view.
Figure 5:
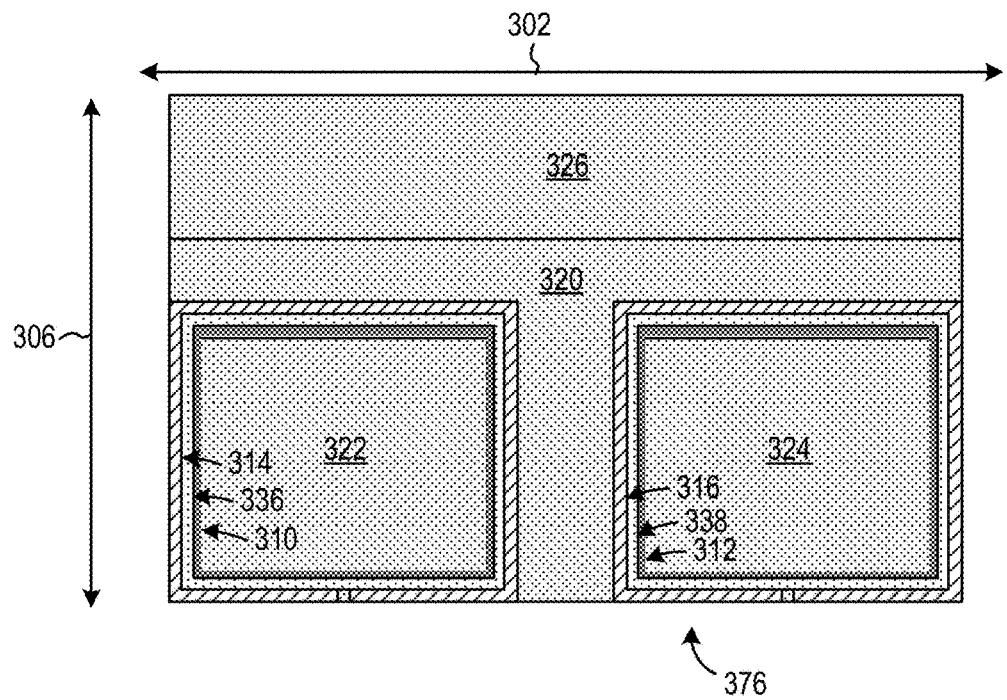
FIG. 5 is a cross-sectional view of the integrated transformer and coupled inductor of FIG. 3.
Figure 6:
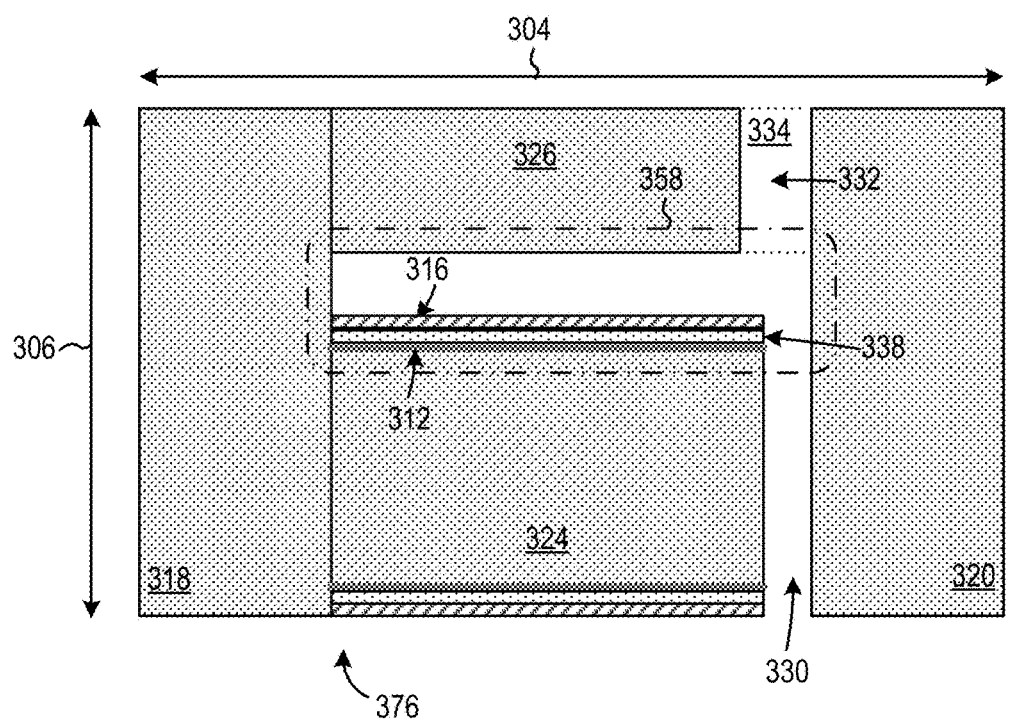
FIG. 6 is another cross-sectional view of the integrated transformer and coupled inductor of FIG. 3.
Figure 7:
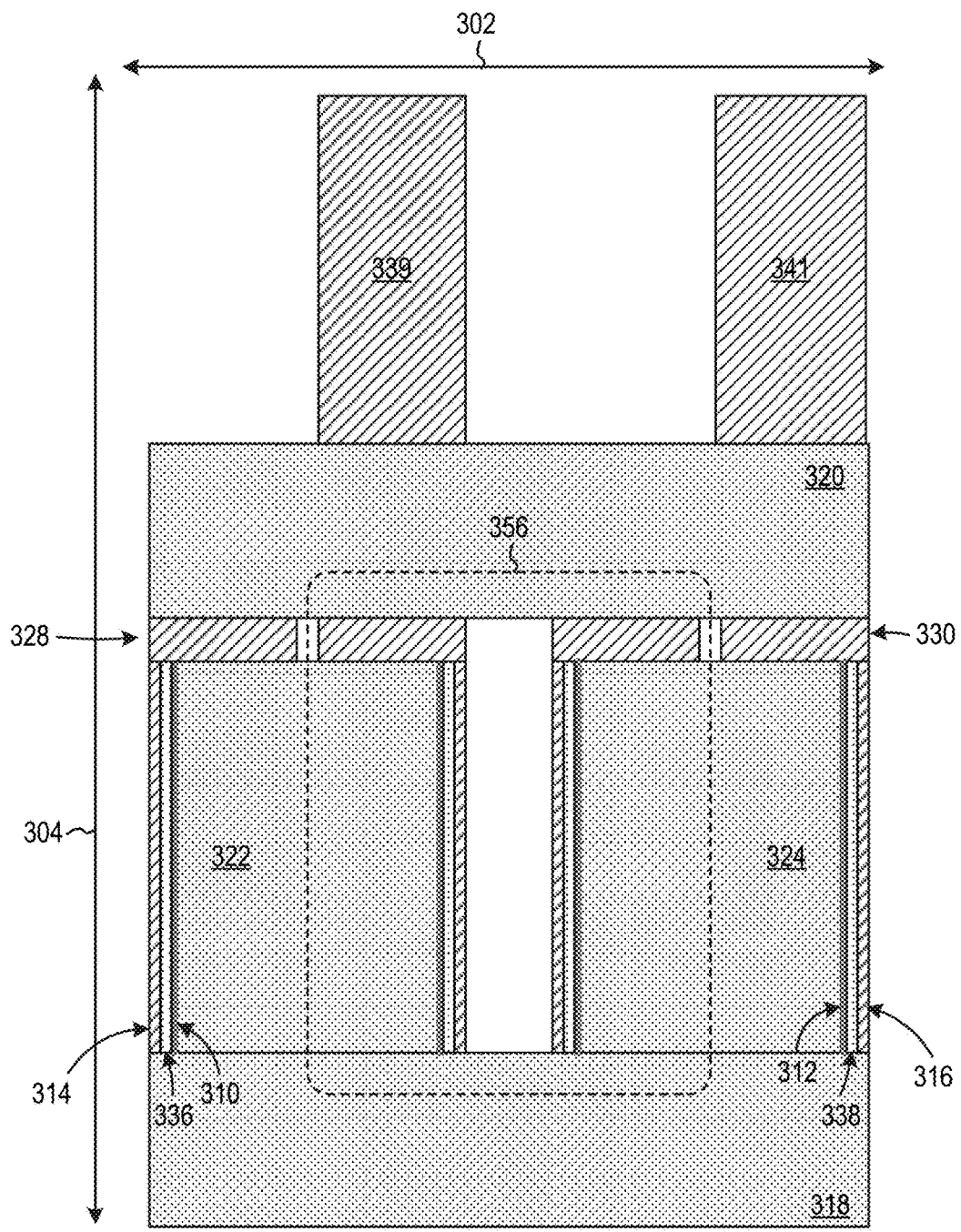
FIG. 7 is yet another cross-sectional view of the integrated transformer and coupled inductor of FIG. 3.
Figure 8:
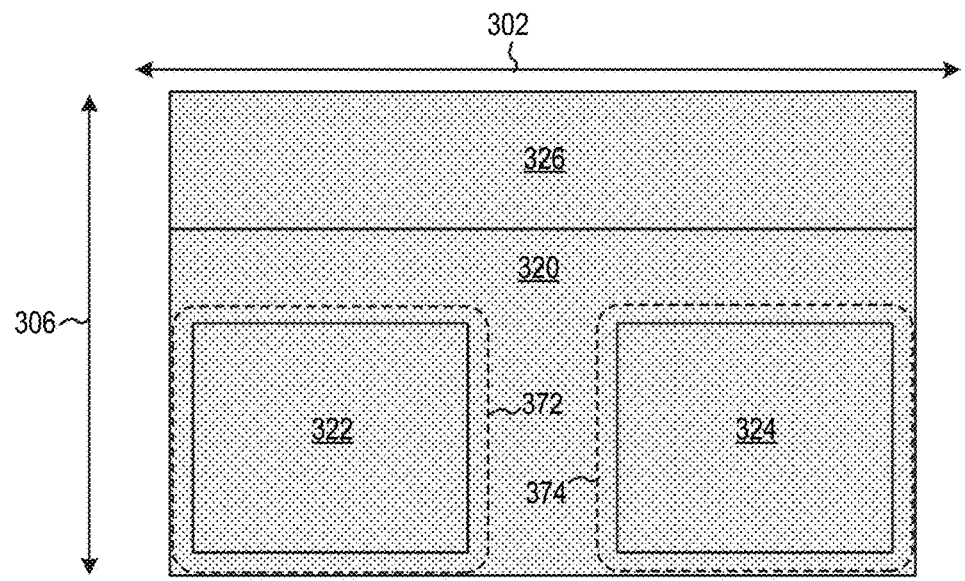
FIG. 8 is a cross-sectional view like that of FIG. 5 but with the windings omitted.

FIG. 3 is a perspective view of an integrated transformer and coupled inductor 300, hereinafter referred to as integrated magnetic device 300, having a length 302, a width 304, and a height 306. Integrated magnetic device 300 includes a magnetic core 308, a first primary winding 310, a second primary winding 312, a first secondary winding 314, and a second secondary winding 316. FIG. 4 is a perspective view of integrated magnetic device 300 with magnetic core 308 shown in wire view, i.e., with only the outline of magnetic core 308 shown, to show interior portions of integrated magnetic device 300. FIG. 5 is a cross-sectional view of integrated magnetic device 300 taken along line 5A-5A of FIG. 3, FIG. 6 is a cross-sectional view of integrated magnetic device 300 taken along line 6A-6A of FIG. 3, FIG. 7 is a cross-sectional view of integrated magnetic device 300 taken along line 7A-7A of FIG. 3, and FIG. 8 is a cross-sectional view like that of FIG. 5 but with windings omitted to better show features of magnetic core 308.

Magnetic core 308 includes a first rail 318, a second rail 320, a first rung 322, a second rung 324, and a leakage plate 326, each formed of a magnetic material. First rail 318 and second rail 320 are separated from each other in the widthwise 304 direction, and each of first rung 322 and second rung 324 are disposed between first rail 318 and second rail 320 in the widthwise 304 direction. (See, e.g., FIGS. 6 and 7). Each of first rail 318 and second rail 320 completely surrounds each of first rung 322 and second rung 324, as seen when magnetic core 308 is viewed cross-sectionally in the widthwise 304 direction. See, for example, FIG. 8 where portion 372 of second rail 320 completely surrounds first rung 322, and portion 374 of second rail 320 completely surrounds second rung 324, as seen when magnetic core 308 is viewed cross-sectionally the widthwise 304 direction (into the page in FIG. 8). First rail 318 also completely surrounds first rung 322 and second rung 324 in a manner similar to that illustrated in FIG. 8.

Each of first rung 322 and second rung 324 is separated from second rail 320 by a first magnetizing gap 328 and a second magnetizing gap 330, respectively. Each of first magnetizing gap 328 and second magnetizing gap 330 is filled with a gap material (not shown) having a lower magnetic permeability than material forming first rung 322 and second rung 324, respectively. In some embodiments, first magnetizing gap 328 and second magnetizing gap 330 are filled with air, paper, plastic, and/or glue.

The configuration of first magnetizing gap 328 and second magnetizing gap 330 may be varied without departing from the scope hereof. For example, first magnetizing gap 328 could be replaced with multiple gaps in first rung 322. Additionally, first magnetizing gap 328 and second magnetizing gap 330 could be located in different locations along their respective rungs 322 and 324 in the widthwise 304 direction. For example, first magnetizing gap 328 could alternately separate first rung 322 from first rail 318, instead of from second rail 320. Furthermore, in some alternate embodiments, such as when magnetic core 308 is formed of a magnetic material having a distributed gap, first magnetizing gap 328 and second magnetizing gap 330 are omitted. Magnetizing inductance of the coupled inductor is a function of the configuration of first and second magnetizing gaps 328 and 330. For example, magnetizing inductance can be decreased by increasing the thickness of first and second magnetizing gaps 328 and 330 in the widthwise 304 direction.

Leakage plate 326 is disposed between first rail 318 and second rail 320 in the widthwise 304 direction, and leakage plate 326 is also disposed over each of first rung 322 and second rung 324 in the height 306 direction. Leakage plate 326 is separated from second rail 320 in the widthwise 304 direction by a leakage gap 332 filled with a gap material 334 having a lower magnetic permeability than material forming leakage plate 326. (See, e.g., FIGS. 3 and 6). In some embodiments, gap material 334 is air, paper, plastic, and/or glue. Leakage inductance associated with first secondary winding 314 and second secondary winding 316 is a function of the configuration of leakage gap 332. For example, leakage inductance of the two secondary windings can be decreased by increasing thickness of leakage gap 332 in the widthwise 304 direction.

The location of leakage gap 332 along leakage plate 326 in the widthwise 304 direction could be varied without departing from the scope hereof. For example, leakage gap 332 could separate leakage plate 326 from first rail 318, instead of from second rail 320. Additionally, leakage gap 332 could be replaced with multiple gaps in leakage plate 326 in the widthwise 304 direction. Furthermore, in some embodiments, such as when some or all of magnetic core 308 is formed of a magnetic material having a distributed gap, leakage gap 332 is omitted.

In some embodiments, first rail 318 and leakage plate 326 collectively form a monolithic (single-piece) magnetic element separate from first rung 322 and second rung 324. This magnetic core configuration advantageously promotes ease of manufacturing integrated magnetic device 300, as discussed below.

Figure 9:
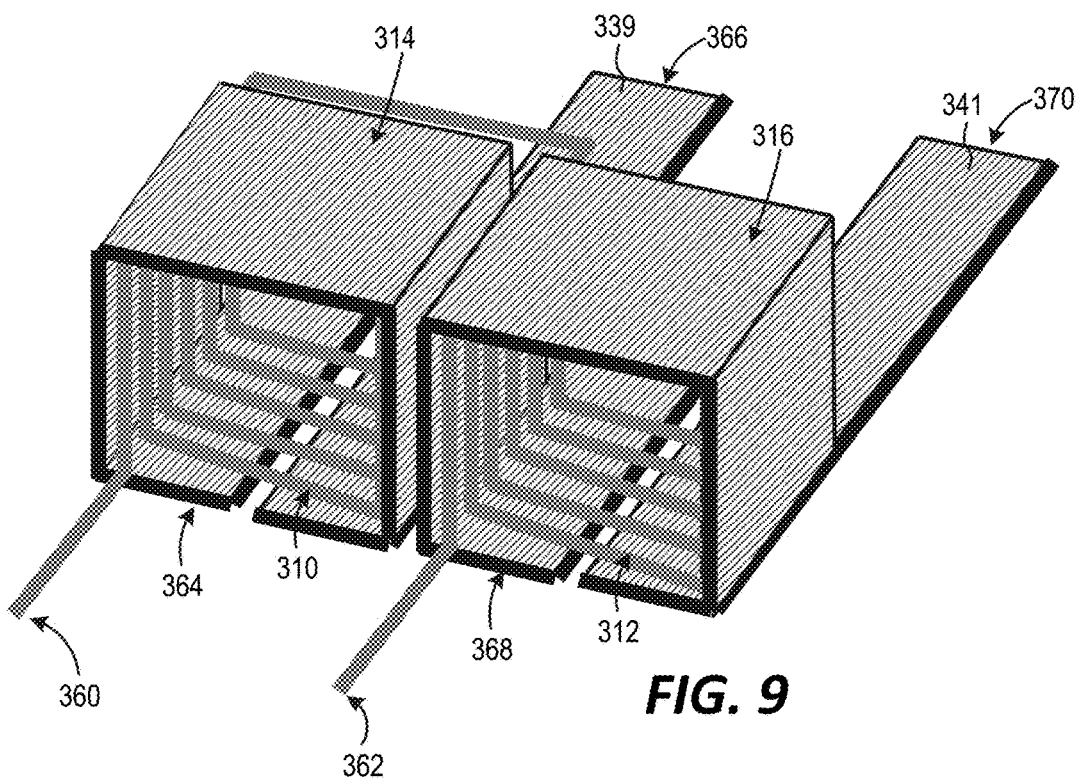
FIG. 9 is a perspective of the windings of the FIG. 3 integrated transformer and coupled inductor.
Figure 10:
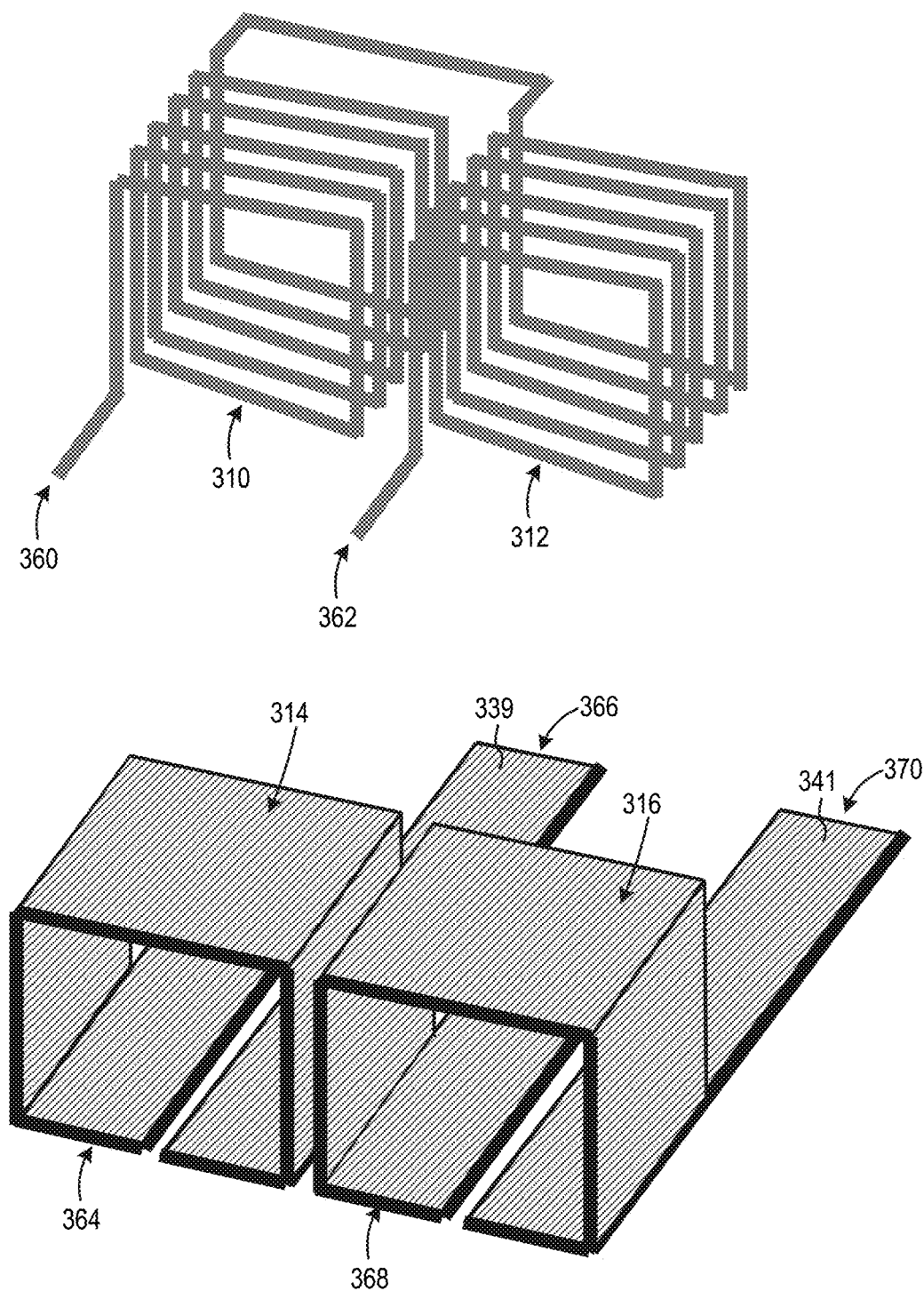
FIG. 10 is another perspective view of the windings of the FIG. 3 integrated transformer and coupled inductor.

First primary winding 310 and first secondary winding 314 are concentrically wound around first rung 322, and second primary winding 312 and second secondary winding 316 are concentrically wound around second rung 324. (See, e.g., FIGS. 4 and 5). First primary winding 310 has an end 360, and second primary winding 312 has an end 362. The other ends of first primary winding 310 and second primary winding 312 are joined such that first primary winding 310 and second primary winding 312 are electrically coupled in series and are in-phase. In some alternate embodiments, however, first primary winding 310 and second primary winding 312 are not electrically coupled within integrated magnetic device 300 but are instead electrically coupled in series external to integrated magnetic device 300. Insulating material 336 separates first primary winding 310 from first secondary winding 314, and insulating material 338 separates second primary winding 312 from second secondary winding 316. In some embodiments, insulating material 336 and 338 is separate from the windings, such as dielectric tape separate from the windings. In some other embodiments, insulating material 336 and 338 is at least partially embodied by insulation on the windings. FIG. 9 is a perspective view of the windings of integrated magnetic device 300 in their relative positions, and FIG. 10 is a perspective view of the windings of integrated magnetic device 300 separated from each other.

In some embodiments, each of first primary winding 310, second primary winding 312, first secondary winding 314, and second secondary winding 316 extends to a bottom outer surface 376 of integrated magnetic device 300 to facilitate connecting the windings to external circuitry. Bottom outer surface 376 extends in the lengthwise 302 and widthwise 304 directions, for example, for mounting integrated magnetic device 300 to a substrate, such as a printed circuit board. First secondary winding 314 has opposing ends 364 and 366, and end 366 forms an extended tab 339. Second secondary winding 316 has opposing ends 368 and 370, and end 370 forms an extended tab 341. (See, e.g., FIGS. 9 and 10). Extended tabs 339 and 341 are used, for example, to replace or supplement printed circuit board (PCB) conductors. In some embodiments, extended tabs 339 and 341 are twenty to thirty times thicker than typical PCB board conductors such that extended tabs 339 and 341 have a much lower resistance than typical PCB conductors. The relatively large thermal mass of extended tabs 339 and 341 may also help cool integrated magnetic device 300. First and second secondary windings 314 and 316 are wound on magnetic core 308 out-of-phase with respect to each other such that positive current flowing into end 364 of first secondary winding 314 induces positive current flowing into end 368 of second secondary winding 316.

It is anticipated that magnitude of current through the secondary windings will be greater than magnitude of current through the primary windings in many applications of integrated magnetic device 300. Consequentially, in some embodiments, the secondary windings are optimized to minimize resistance, while the primary windings are optimized for ease of manufacturing and low cost. For example, in the illustrated embodiment, each of first secondary winding 314 and second secondary winding 316 is formed of metallic foil, to promote low alternating current (AC) and direct current (DC) resistance of windings, while first primary winding 310 and second primary winding 312 are formed of wire, to promote ease of manufacturing and low cost. In some embodiments, first primary winding 310 and second primary winding 312 are each formed of multi-filar wire, i.e. wire having multiple strands, to promote low AC resistance. Each secondary winding 314 and 316 is disposed outside of its respective primary winding 310 and 312, for example, to promote cooling of integrated magnetic device 300 and ease of soldering of the secondary windings to a PCB. Disposing secondary windings 314 and 316 outside of their respective primary windings 310 and 312 also helps achieve a wide radius of bending of secondary windings 314 and 316, thereby promoting ease of manufacturing the secondary windings.

Figure 11:
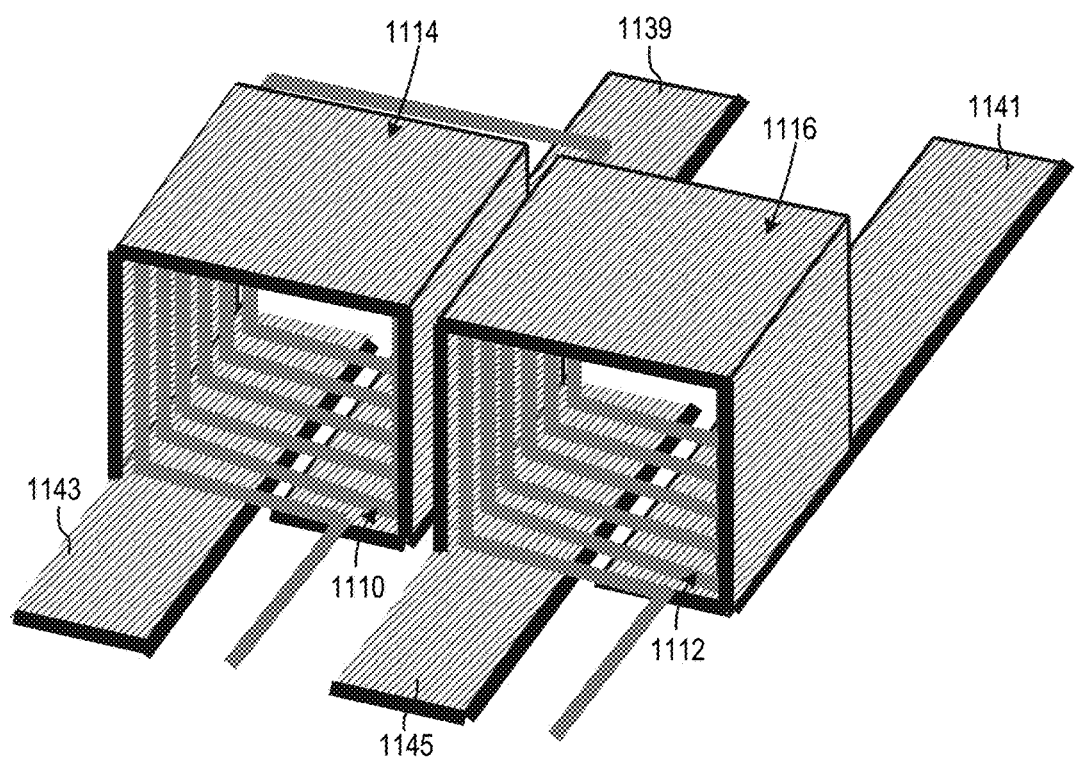
FIG. 11 is a perspective view of an alternative set of windings for the FIG. 3 integrated transformer and coupled inductor.

The configuration of the windings of integrated magnetic device 300 can be varied without departing from the scope hereof. For example, FIG. 11 is a perspective view of a first primary winding 1110, a second primary winding 1112, a first secondary winding 1114, and a second secondary winding 1116, which may be used in place of first primary winding 310, second primary winding 312, first secondary winding 314, and second secondary winding 316, respectively. In contrast to first and second secondary windings 314 and 316, each end of first and second secondary windings 1114 and 1116 forms an extended tab. In particular, opposing ends of first secondary winding 1114 form respective extended tabs 1139 and 1143, and opposing ends of second secondary winding 1116 form respective extended tabs 1141 and 1145.

Figure 12:
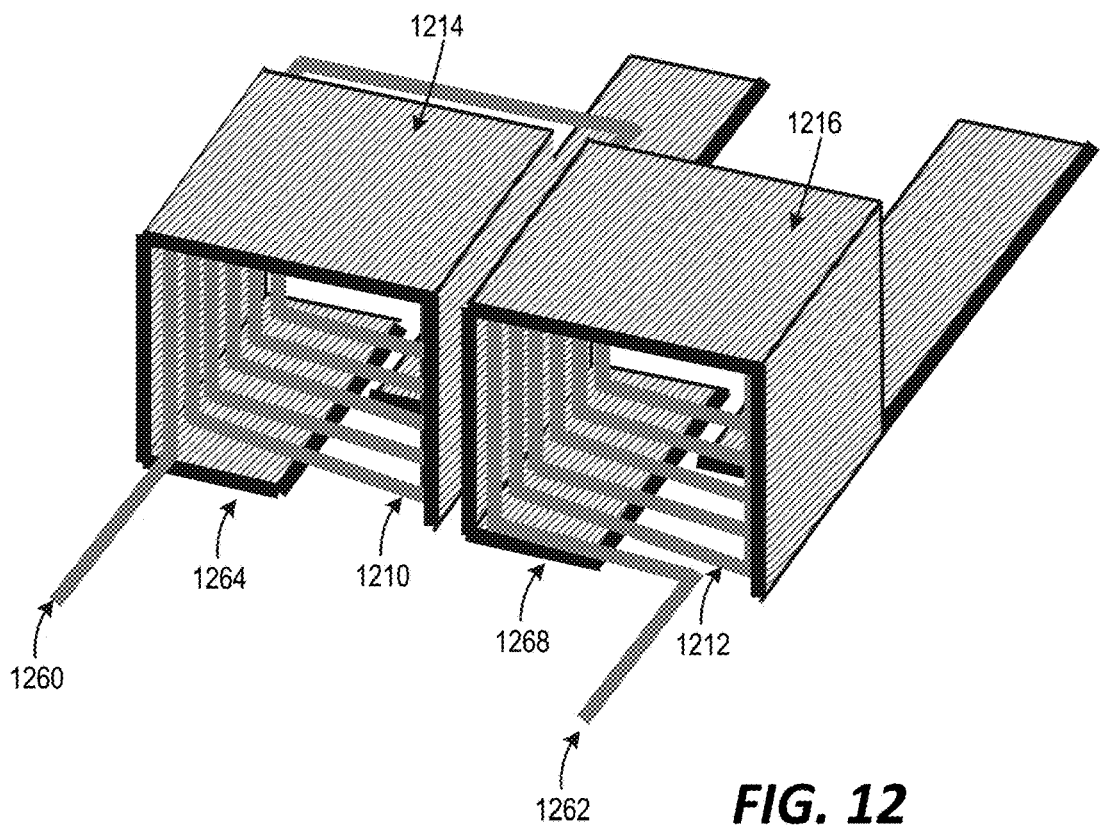
FIG. 12 is a perspective view of another alternative set of windings for the FIG. 3 integrated transformer and coupled inductor.

As another example, FIG. 12 is a perspective view of a first primary winding 1210, a second primary winding 1212, a first secondary winding 1214, and a second secondary winding 1216, which may be used in place of first primary winding 310, second primary winding 312, first secondary winding 314, and second secondary winding 316, respectively. Respective ends 1260 and 1262 of first and second primary windings 1210 and 1212 are spaced relatively far apart, which may facilitate connecting together respective ends 1264 and 1268 of first and second secondary windings 1214 and 1216.

Figure 13:
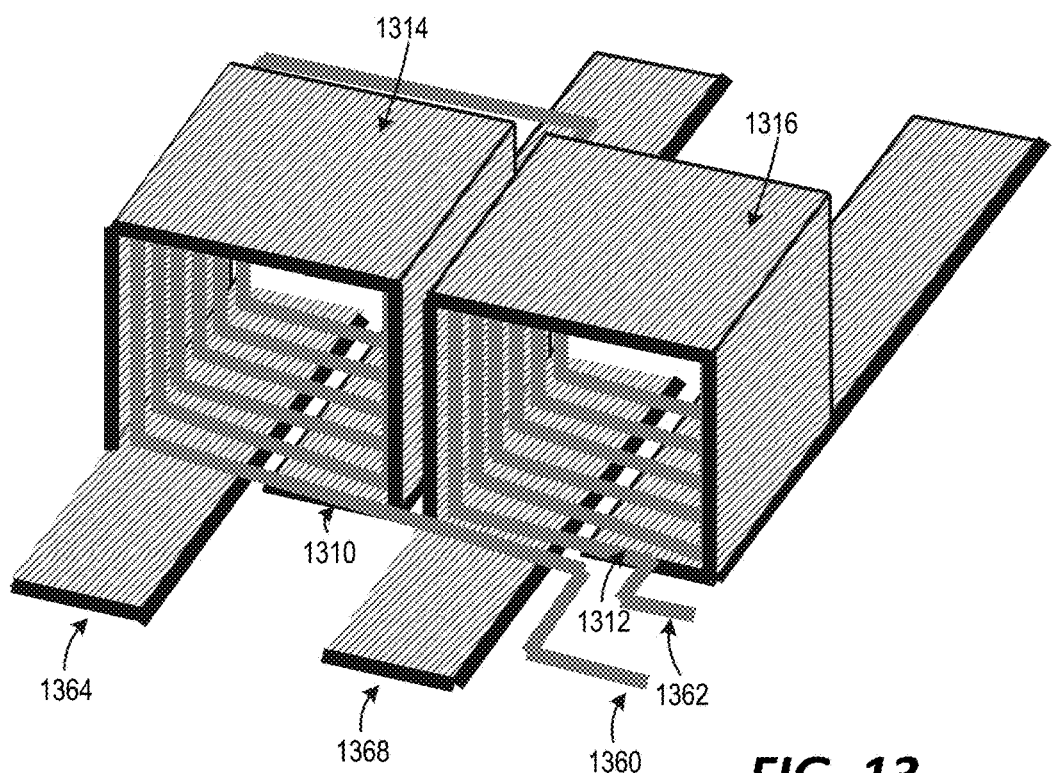
FIG. 13 is a perspective view of another alternative set of windings for the FIG. 3 integrated transformer and coupled inductor.

FIG. 13 is a perspective view of a first primary winding 1310, a second primary winding 1312, a first secondary winding 1314, and a second secondary winding 1316, which may be used in place of first primary winding 310, second primary winding 312, first secondary winding 314, and second secondary winding 316, respectively. Respective ends 1360 and 1362 of first and second primary windings 1310 and 1312 terminate together off to the side of the windings, which may facilitate connecting together respective ends 1364 and 1368 of first and second secondary windings 1314 and 1316.

Figure 14:
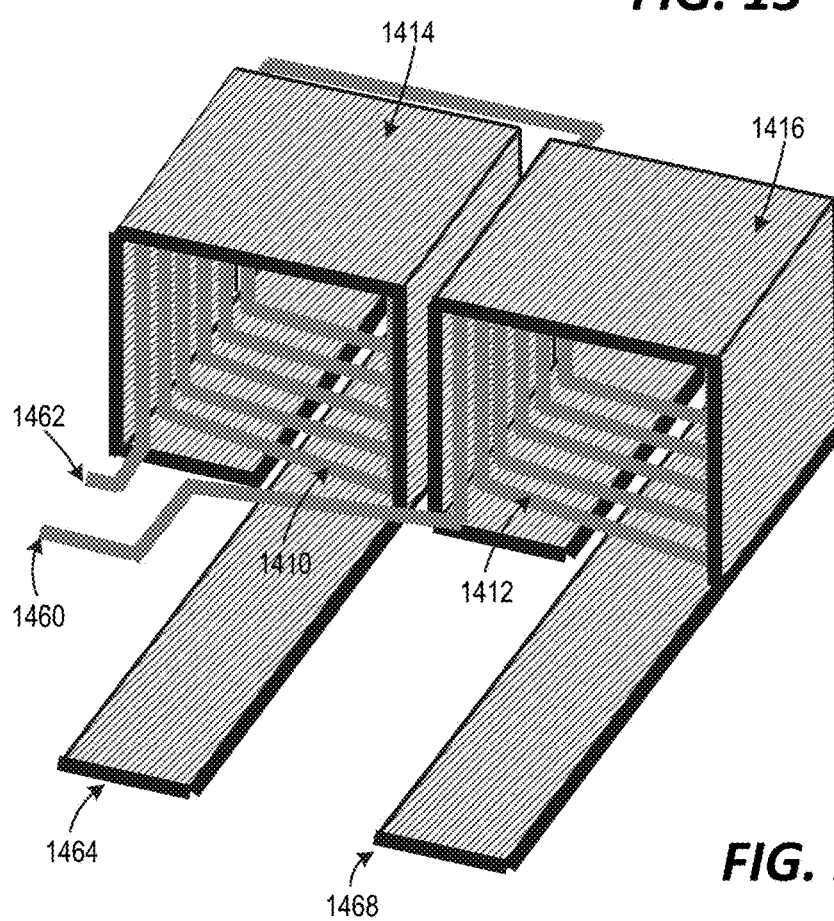
FIG. 14 is a perspective view of yet another alternative set of windings for the FIG. 3 integrated transformer and coupled inductor.

FIG. 14 is a perspective view of a first primary winding 1410, a second primary winding 1412, a first secondary winding 1414, and a second secondary winding 1416, which may be used in place of first primary winding 310, second primary winding 312, first secondary winding 314, and second secondary winding 316, respectively. Respective ends 1460 and 1462 of first and second primary windings 1410 and 1412 terminate together off to the side of the windings, which may facilitate connecting together respective ends 1464 and 1468 of first and second secondary windings 1414 and 1416.

Figure 15:
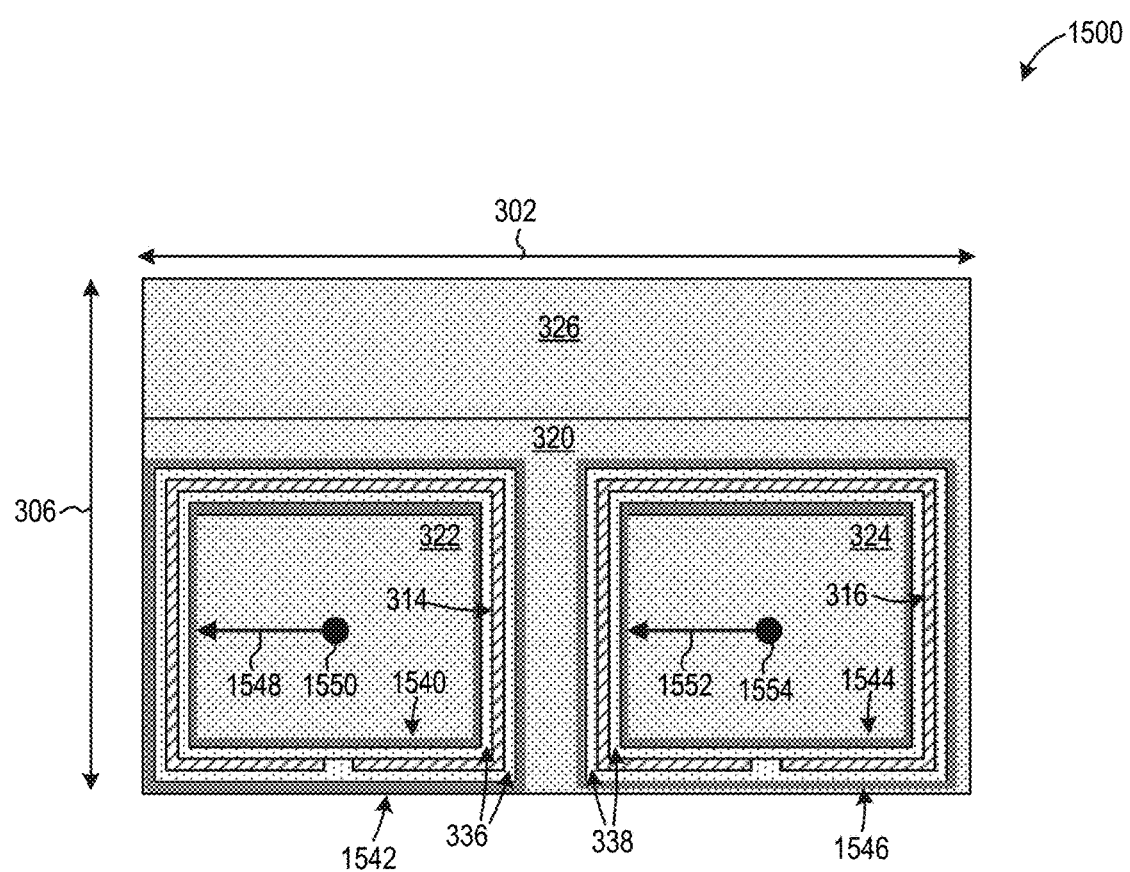
FIG. 15 is a cross-sectional view of an integrated transformer and coupled inductor like that of FIG. 3, but where each primary winding is split into two portions, according to an embodiment.

In some alternate embodiments, primary windings 310 and 312 and/or secondary winding 314 and 316 include multiple turns and are wound around their respective rungs 322 and 324 in an alternating manner to further promote strong magnetic coupling of the primary windings with the secondary windings. For example, FIG. 15 is a cross-sectional view of an integrated magnetic device 1500, which is like integrated magnetic device 300 of FIGS. 3-8, but where first primary winding 310 is replaced with a first primary winding split into two portions 1540 and 1542 electrically coupled in series, and where second primary winding 312 is replaced with a second primary winding split into two portions 1544 and 1546 electrically coupled in series. Portions 1540 and 1542 may be electrically coupled in series either within integrated magnetic device 1500 or external to integrated magnetic device 1500. Similarly, portions 1544 and 1546 may be electrically coupled in series either within integrated magnetic device 1500 or external to integrated magnetic device 1500. First secondary winding 314 is disposed between portions 1540 and 1542 in a radial direction 1548 relative to a widthwise center axis 1550 of first rung 322, such that first secondary winding 314 and the first primary winding are wound around first rung 322 in an alternating manner. Similarly, second secondary winding 316 is disposed between portions 1544 and 1546 in a radial direction 1552 relative to a widthwise center axis 1554 of second rung 324, such that the second primary winding and second secondary winding 316 are wound around second rung 324 in an alternating manner.

Integrated magnetic devices 300 and 1500 could be modified to include additional rungs and associated windings without departing from the scope hereof. For example, one alternate embodiment (not illustrated) of integrated magnetic device 300 includes an additional rung disposed between first rail 318 and second rail 320 in widthwise 304 direction and a respective primary and secondary winding concentrically wound around the additional rung.

Figure 1:
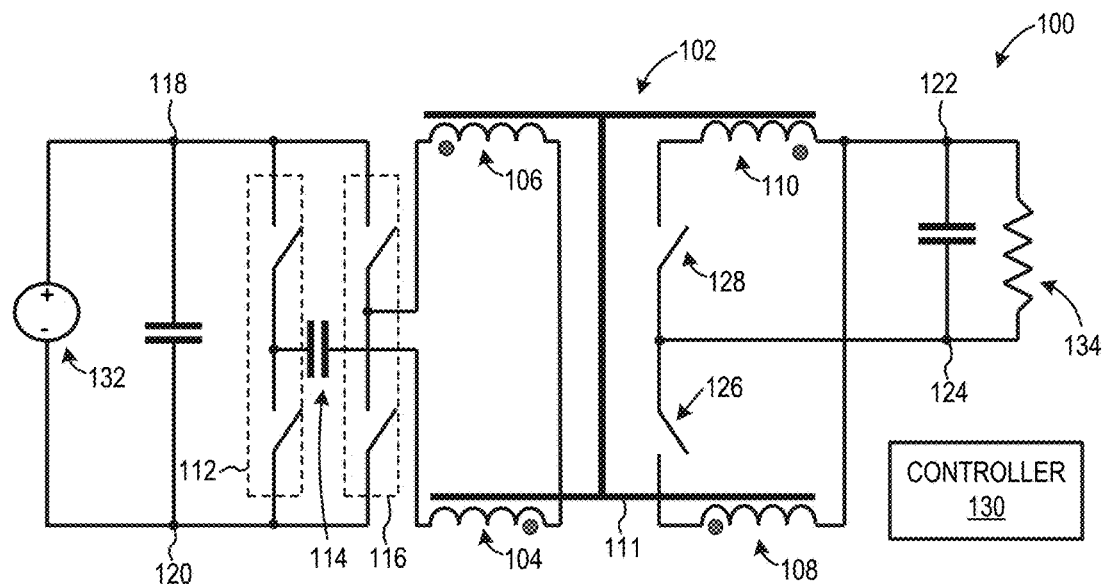
FIG. 1 illustrates a prior-art current doubler.
Figure 2:
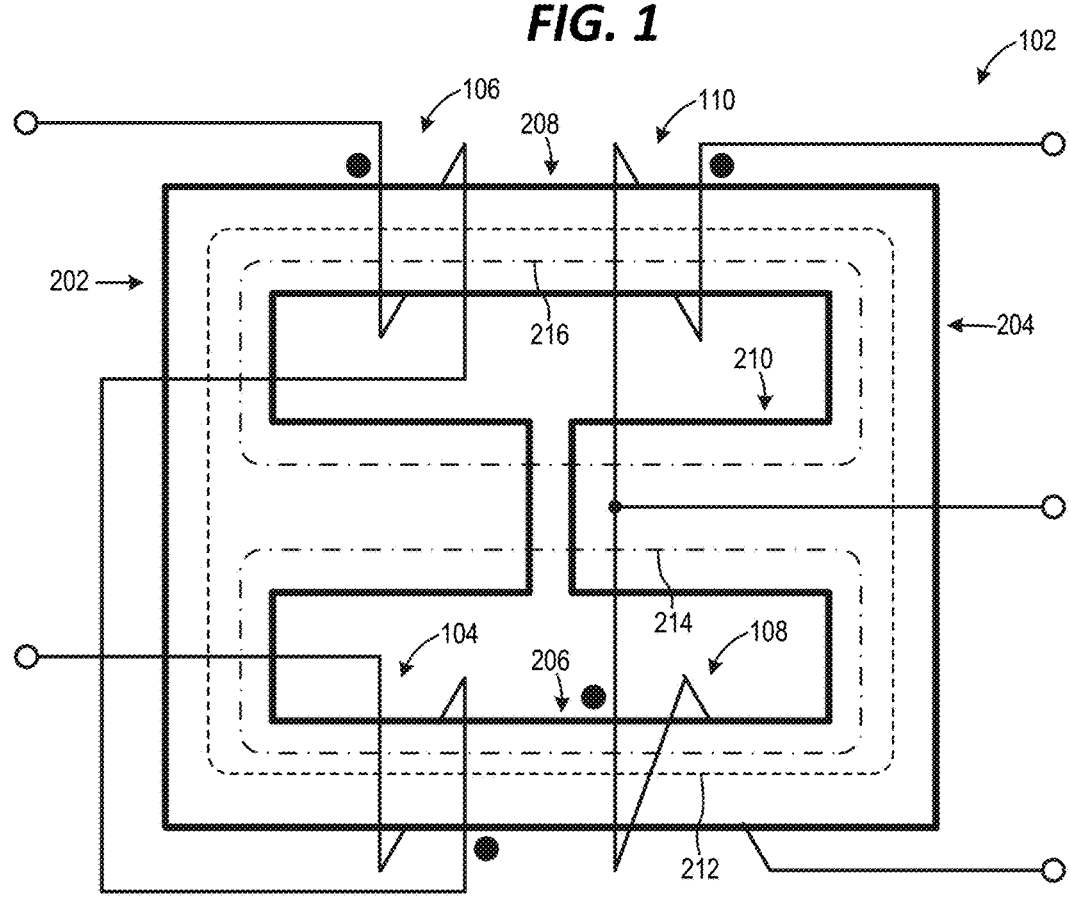
FIG. 2 illustrates a prior-art integrated transformer and coupled inductor.

Integrated magnetic devices 300 and 1500 each potentially achieve significant advantages over conventional integrated transformers and coupled inductors. For example, the fact that leakage plate 326 is disposed over first and second rungs 322 and 324 in the height 306 direction promotes small device footprint, where the footprint is the area occupied by the device in the length 302 by width 304 directions. In conventional integrated magnetic device 102 of FIGS. 1 and 2 in contrast, gapped leakage post 210 is disposed between rungs 206 and 208, causing conventional integrated magnetic device 102 to have a relatively large footprint.

As another example, the winding configuration of integrated magnetic devices 300 and 1500 promotes strong magnetic coupling of the primary and secondary windings, ease of manufacture, short magnetic flux paths, and small device footprint. In particular, the fact that each primary winding is concentric with its respective secondary winding helps minimize separation between the primary and secondary windings, thereby promoting strong magnetic coupling of the windings. Additionally, the concentric nature of the primary and secondary windings allows the secondary winding to be slid over the primary winding, or vice versa, during manufacturing, thereby promoting ease of manufacture. Furthermore, the concentric nature of the primary and secondary windings minimizes surface area of first and second rungs 322 and 324 required for the windings, thereby helping minimize dimensions of first and second rungs 322 and 324 in the widthwise 304 direction, which promotes short magnetic flux paths and small integrated magnetic device footprint.

As yet another example, the relationship between the magnetic core and the windings of integrated magnetic devices 300 and 1500 promotes short paths for both coupling magnetic flux and leakage magnetic flux. To help appreciate this advantage, consider again FIGS. 6 and 7. Dashed line 356 in FIG. 7 illustrates the approximate coupling magnetic flux path within magnetic core 308, while dashed line 358 in FIG. 6 illustrates the approximate leakage magnetic flux path within magnetic core 308 associated with second secondary winding 316. The leakage magnetic flux path (not shown) associated with first secondary winding 314 is like that of second secondary winding 316 but flows through first rung 322 instead of through second rung 324. The coupling magnetic flux paths are substantially in lengthwise 302 by widthwise 304 planes, while the leakage magnetic flux paths are substantially in widthwise 304 by height planes 306. Accordingly, the coupling magnetic flux paths are substantially orthogonal to the leakage magnetic flux paths. It should be appreciated that this configuration causes both of the coupling and leakage magnetic flux paths to be relatively short, thereby promoting low core losses and associated high efficiency. In conventional integrated magnetic device 102 of FIGS. 1 and 2 in contrast, the coupling magnetic flux path traverses the majority of the magnetic core's perimeter, causing the coupling magnetic flux path to be relatively long. This long coupling magnetic flux path in conventional integrated magnetic device 102 is particularly undesirable because magnitude of coupling magnetic flux is typically relatively large, and therefore, efficiency is significantly impaired by the long coupling magnetic flux path length. Additionally, in the conventional integrated magnetic devices disclosed in Chandrasekaran '875, coupling magnetic flux traverses a relatively long path to link non-adjacent windings.

Furthermore, the relationship between the magnetic core and the windings of integrated magnetic devices 300 and 1500 helps minimize generation of fringing magnetic flux, which is magnetic flux traveling outside of the magnetic core, while promoting small size of the integrated magnetic devices. In particular, each of first rail 318 and second rail 320 completely surrounds each of first rung 322 and second rung 324, as seen when magnetic core 308 is viewed cross-sectionally in the widthwise 304 direction, as discussed above. This feature enables the turn(s) of each winding 310, 312, 314, and 316 to be substantially or completely disposed within the outer boundaries of magnetic core 308, thereby helping contain magnetic flux to magnetic core 308 and helping minimize generation of fringing magnetic flux. For example, see FIG. 6 where the turns of each winding 310, 312, 314, and 316 are completely disposed within the widthwise 304 by height 306 cross-section of magnetic core 308, thereby helping confine magnetic flux to magnetic core 308. As another example, see FIG. 7 where the turns of each winding 310, 312, 314, and 316 are completely disposed within the lengthwise 302 by widthwise 304 cross-section of magnetic core 308, thereby also helping confine magnetic flux to magnetic core 308. Magnetic core 308 may extend to the edges of the winding turns, as illustrated in FIGS. 3-7, to promote small size of integrated magnetic devices 300 and 1500, while substantially confining magnetic flux to magnetic core 308.

In the devices of Chandrasekaran '875, in contrast, windings extend beyond the magnetic core outer boundaries, causing the devices to potentially generate significant fringing magnetic flux. Generation of fringing magnetic flux is undesirable because it may couple to nearby conductors, such as PCB traces, and induce eddy current therein. The eddy currents, in turn, cause power losses and associated conductor heating. Additionally, fringing magnetic flux may cause electromagnetic interference with nearby electronic circuitry.

Figure 16:
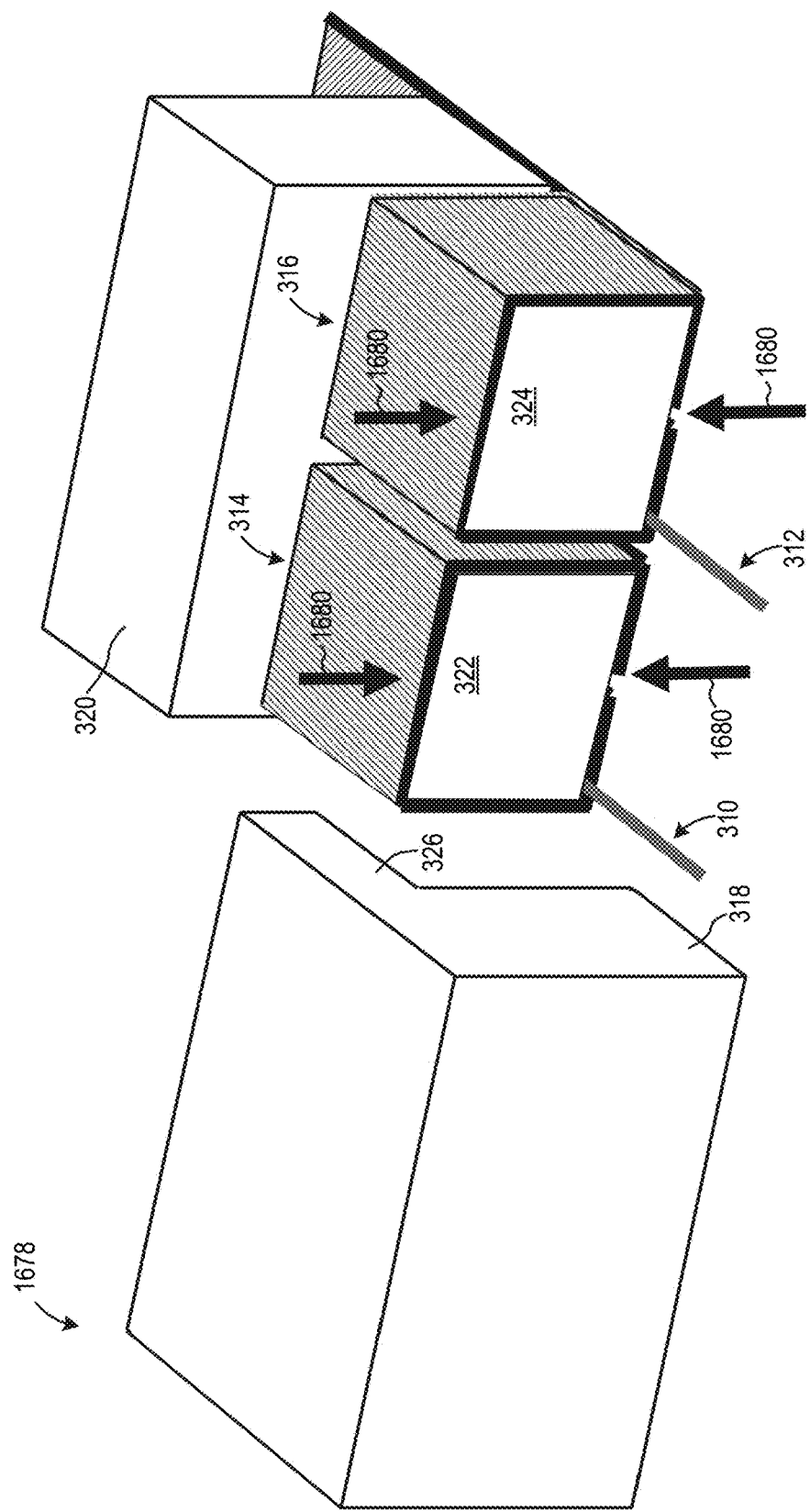
FIG. 16 is an exploded perspective view of the integrated transformer and coupled inductor of FIG. 3 where a first rail and a leakage plate collectively form a monolithic magnetic element, according to an embodiment.
Figure 17:
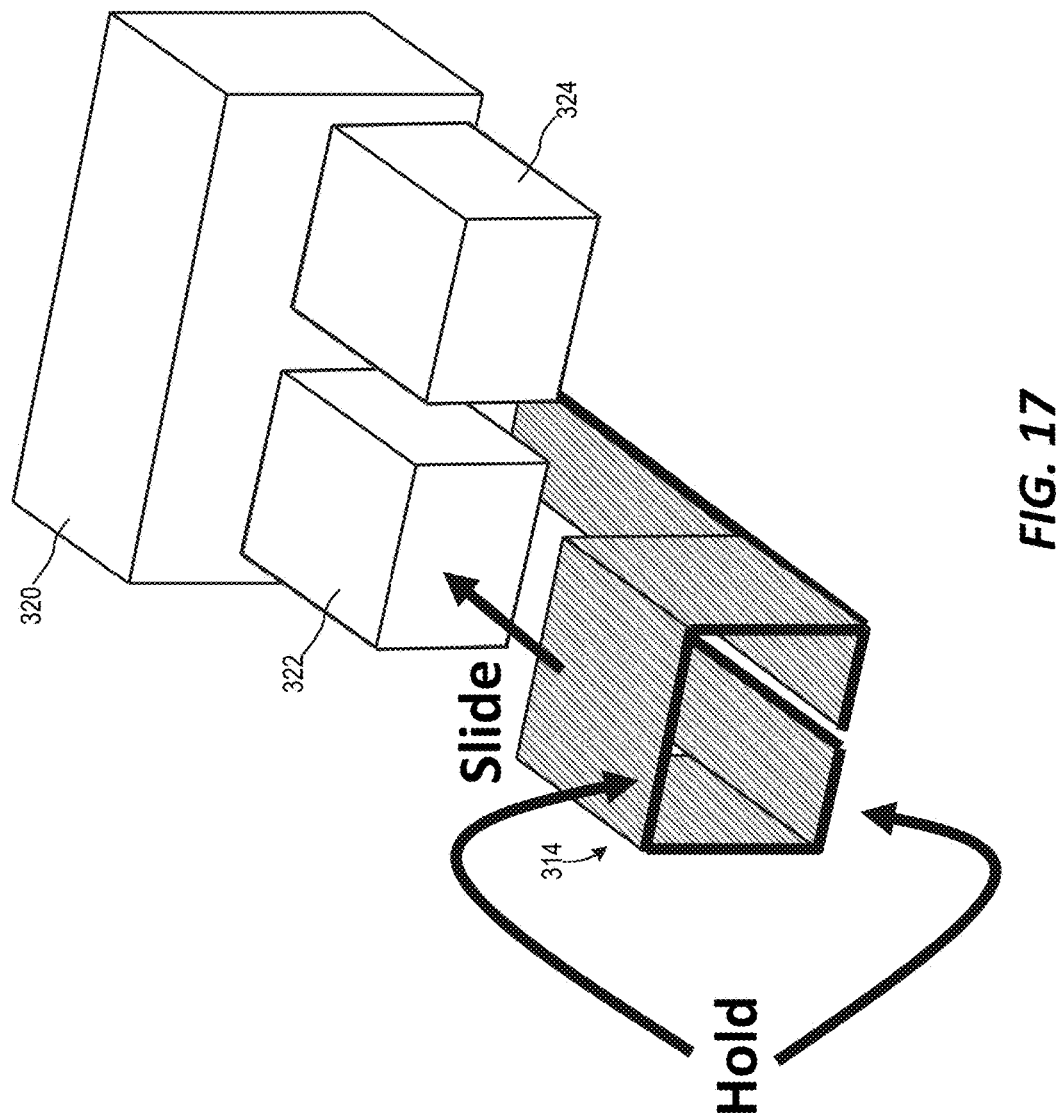
FIG. 17 illustrates a winding being installed on the integrated transformer and coupled inductor of FIG. 16, according to an embodiment.

Moreover, certain embodiments of integrated magnetic devices 300 and 1500 promote ease of manufacturing by enabling opposing sides of the windings to be held when installing the windings on first and second rungs 322 and 324. For example, FIG. 16 is an exploded perspective view of an embodiment of integrated magnetic device 300 where first rail 318 and leakage plate 326 collectively form a monolithic magnetic element 1678 separate from first rung 322 and second rung 324. FIG. 17 illustrates first secondary winding 314 being installed on first rung 322 in the embodiment of FIG. 16. Windings 310, 312, 314, and 316 can advantageously be installed on their respective rungs 322 and 324 before monolithic magnetic element 1678 is joined with the rungs and second rail 320 in the device of FIGS. 16 and 17, thereby enabling the windings to be held from opposing sides during installation, as indicated by arrows 1680. This ability to hold windings from opposing sides facilitates sliding the windings onto their respective posts, as illustrated in FIG. 17, thereby promoting ease of manufacturing. In the devices disclosed in Chandrasekaran '875 in contrast, the magnetic core blocks access to opposing sides of the windings, thereby preventing the windings from being held on opposing sides during their installation on the magnetic core.

One possible application of integrated magnetic devices 300 and 1500 is in a current doubler. Discussed below are several examples of integrated magnetic device 300 in such application. It should be appreciated, however, that integrated magnetic devices 300 and 1500 are not limited to the exemplary current doubler applications discussed below, or even to current doubler applications in general. Instead, integrated magnetic devices 300 and 1500 could be used in other applications without departing from the scope hereof.

Figure 18:
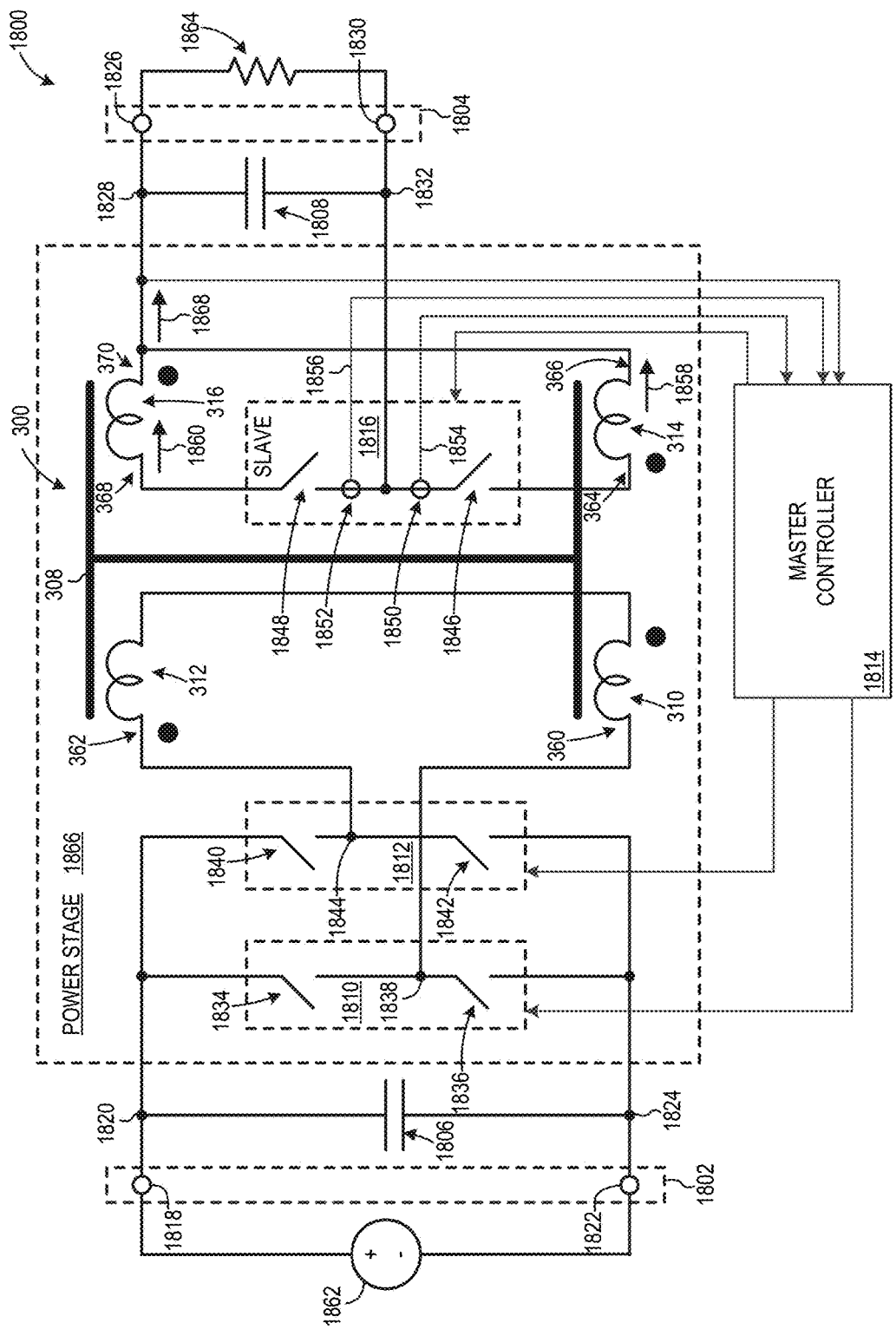
FIG. 18 illustrates a switching power converter having a current doubler topology, according to an embodiment.

FIG. 18 illustrates a switching power converter 1800 having a current doubler topology. Switching power converter 1800 includes an input port 1802, an output port 1804, an input capacitor 1806, an output capacitor 1808, a first primary switching circuit 1810, a second primary switching circuit 1812, a master controller 1814, a slave controller 1816, and an instance of integrated magnetic device 300. Input port 1802 includes a first input terminal 1818 electrically coupled to a positive input power node 1820 and a second input terminal 1822 electrically coupled to a negative input power node 1824. Output port 1804 includes a first output terminal 1826 electrically coupled to a positive output power node 1828 and a second output terminal 1830 electrically coupled to a negative output power node 1832. Input capacitor 1806 is electrically coupled between positive input power node 1820 and negative input power node 1824, and output capacitor 1808 is electrically coupled between positive output power node 1828 and negative output power node 1832.

First primary switching circuit 1810 includes a first upper switching device 1834 and a first lower switching device 1836 electrically coupled in series between positive input power node 1820 and negative input power node 1824. End 360 of first primary winding 310 is electrically coupled to a first primary switching node 1838 where first upper switching device 1834 and first lower switching device 1836 are electrically coupled. Second primary switching circuit 1812 includes a second upper switching device 1840 and a second lower switching device 1842 electrically coupled in series between positive input power node 1820 and negative input power node 1824. End 362 of second primary winding 312 is electrically coupled to a second primary switching node 1844 where second upper switching device 1840 and second lower switching device 1842 are electrically coupled. In this document, a switching device is a device capable of switching between its conductive and non-conductive states, and includes, for example, one or more field effect transistors and/or bipolar junction transistors.

Each of first primary switching circuit 1810 and second primary switching circuit 1812 has a respective high-state, low-state, and off-state. In the high-state of first primary switching circuit 1810, first upper switching device 1834 is operating in its conductive state and first lower switching device 1836 is operating in its non-conductive state, such that end 360 of first primary winding 310 is electrically coupled to positive input power node 1820. In the low-state of first primary switching circuit 1810, first upper switching device 1834 is operating in its non-conductive state and first lower switching device 1836 is operating in its conductive state, such that end 360 of first primary winding 310 is electrically coupled to negative input power node 1824. In the off-state of first primary switching circuit 1810, both first upper switching device 1834 and first lower switching device 1836 are operating in their respective non-conductive states.

Similarly, in the high-state of second primary switching circuit 1812, second upper switching device 1840 is operating in its conductive state and second lower switching device 1842 is operating in its non-conductive state, such that end 362 of second primary winding 312 is electrically coupled to positive input power node 1820. In the low-state of second primary switching circuit 1812, second upper switching device 1840 is operating in its non-conductive state and second lower switching device 1842 is operating in its conductive state, such that end 362 of second primary winding 312 is electrically coupled to negative input power node 1824. In the off-state of second primary switching circuit 1812, both second upper switching device 1840 and second lower switching device 1842 are operating in their respective non-conductive states.

Slave controller 1816 includes a first rectification device 1846, a second rectification device 1848, first current sense circuitry 1850, and second current sense circuitry 1852. First rectification device 1846 is electrically coupled between negative output power node 1832 and end 364 of first secondary winding 314, and second rectification device 1848 is electrically coupled between negative output power node 1832 and end 368 of second secondary winding 316. First rectification device 1846 includes a switching device operating under command of master controller 1814 to emulate a diode, i.e., to allow current to flow only in the direction indicated by arrow 1858. Similarly, second rectification device 1848 includes a switching device operating under command of master controller 1814 to emulate a diode, i.e., to allow current to flow only in the direction indicated by arrow 1860. In some alternate embodiments, first and second rectification devices 1846 and 1848 are implemented by diodes instead of by switching devices emulating diodes. The sum 1868 of current through first secondary winding 314 and current through second secondary winding 316 flows into positive output power node 1828.

First current sense circuitry 1850 senses current flowing through first rectification device 1846 and generates a first current sense signal 1854 representing magnitude of current flowing through first rectification device 1846. First current sense signal 1854 also represents magnitude of current flowing through first secondary winding 314 because first rectification device 1846 is electrically coupled in series with first secondary winding 314. Second current sense circuitry 1852 senses current flowing through second rectification device 1848 and generates a second current sense signal 1856 representing magnitude of current through second rectification device 1848. Second current sense signal 1856 also represents magnitude of current flowing through second secondary winding 316 because second rectification device 1848 is electrically coupled in series with second secondary winding 316. Master controller 1814 uses first and second current sense signals 1854 and 1856, for example, to implement secondary-side current mode control, to achieve a predetermined output voltage-current characteristic, to help balance current in the secondary windings, and/or to help prevent magnetic saturation of integrated magnetic device 300.

Master controller 1814 controls switching of first primary switching circuit 1810 and second primary switching circuit 1812 such that each switching cycle of switching power converter 1800 includes, in the following order, a first power transfer period, a first freewheeling period, a second power transfer period, and a second freewheeling period. The first power transfer period is characterized by first primary switching circuit 1810 operating in its high-state and second primary switching circuit 1812 operating in its low-state. The second power transfer period is characterized by first primary switching circuit 1810 operating in its low-state and second primary switching circuit 1812 operating in its high-state. Each of the first and second freewheeling periods is characterized by both of first primary switching circuit 1810 and second primary switching circuit 1812 operating in its respective off-state. In some embodiments, master controller 1814 controls switching of first primary switching circuit 1810 and second primary switching circuit 1812 to regulate one or more parameters of switching power converter 1800, such as voltage across input port 1802, current through input port 1802, power into input port 1802, voltage across output port 1804, current through output port 1804, and/or power out of output port 1804.

Figure 19:
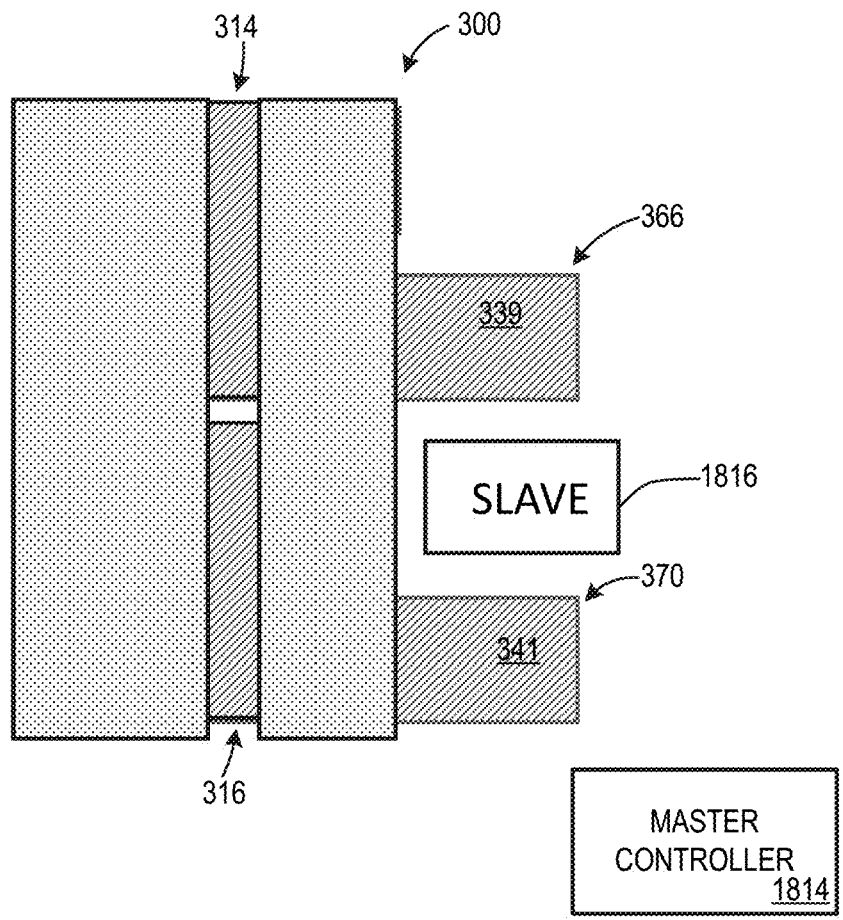
FIG. 19 is a top plan view of one possible layout of the FIG. 18 switching power converter.

In some embodiments, each of master controller 1814 and slave controller 1816 is implemented in a respective integrated circuit. For example, FIG. 19 is a top plan view of one possible layout of switching power converter 1800, where each of master controller 1814 and slave controller 1816 is implemented in a respective integrated circuit. It should be noted that slave controller 1816 is located close to ends 366 and 370 of first and second secondary windings 314 and 316, respectively. This close proximity of slave controller 1816 to ends 366 and 370 advantageously promotes a low impedance connection between first and second rectification devices 1846 and 1848 and first and second secondary windings 314 and 316, respectively. Furthermore, the close proximity of slave controller 1816 to first and second secondary windings 314 and 316 promotes low noise on first and second current sense signals 1854 and 1856. Input port 1802, output port 1804, input capacitor 1806, and output capacitor 1808 are not shown in FIG. 19 to promote illustrative clarity.

Figure 20:
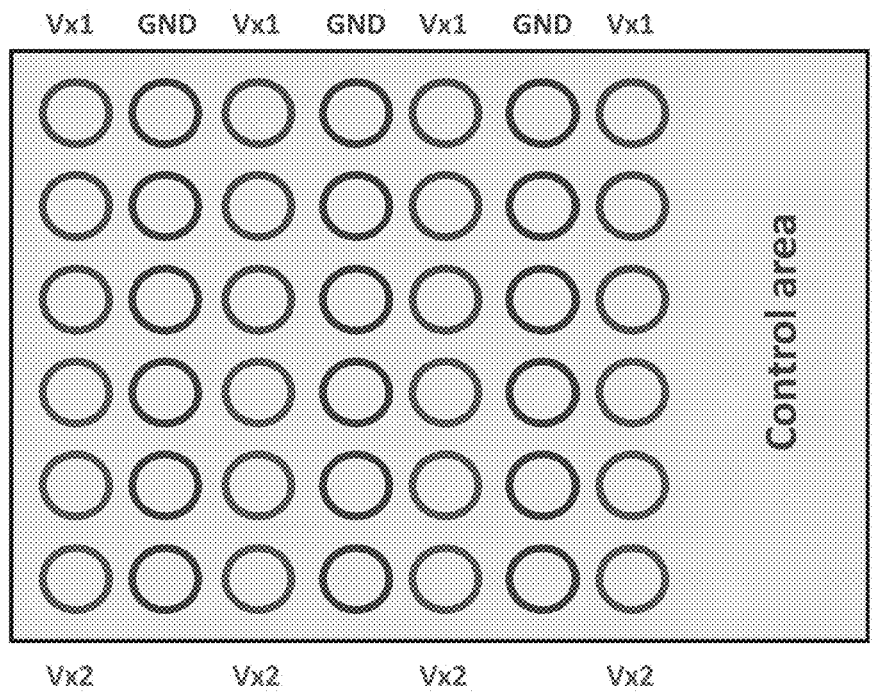
FIG. 20 illustrates one possible pinout of a slave controller of the FIG. 18 switching power converter.
Figure 21:
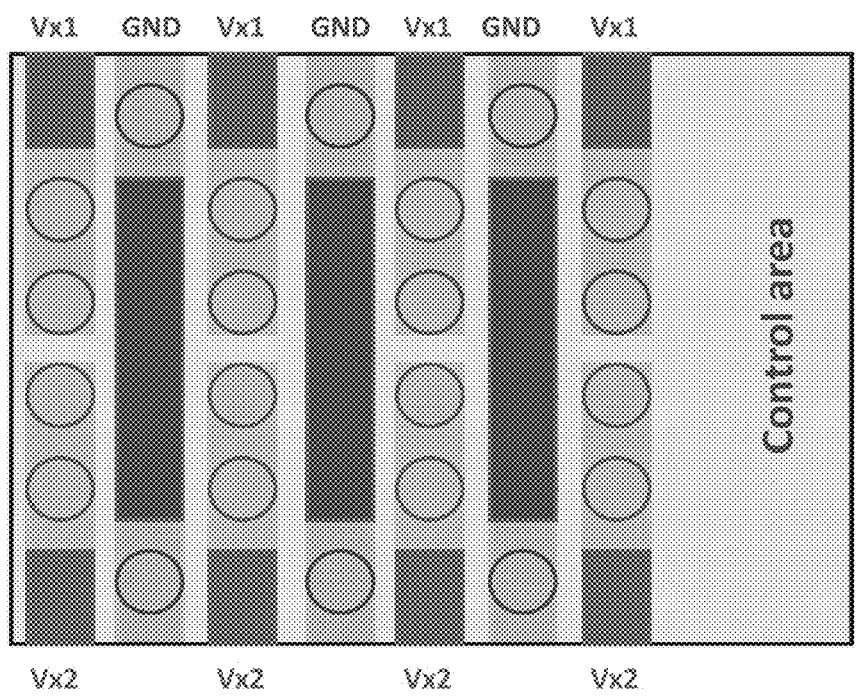
FIG. 21 illustrates another possible pinout of the slave controller of the FIG. 18 switching power converter.

FIGS. 20-23 illustrate several possible pinouts of slave controller 1816 when implemented as an integrated circuit. In FIGS. 20-23, terminals Vx1 connect to end 364 of first secondary winding 314, terminals Vx2 connect to end 368 of second secondary winding 316, and terminals GND connect to negative output power node 1832. FIGS. 20 and 22 each illustrate a die ballout inside the integrated circuit package, while FIGS. 21 and 23 each illustrate a quad-flat-no-leads (QFN) pinout.

Figure 24:
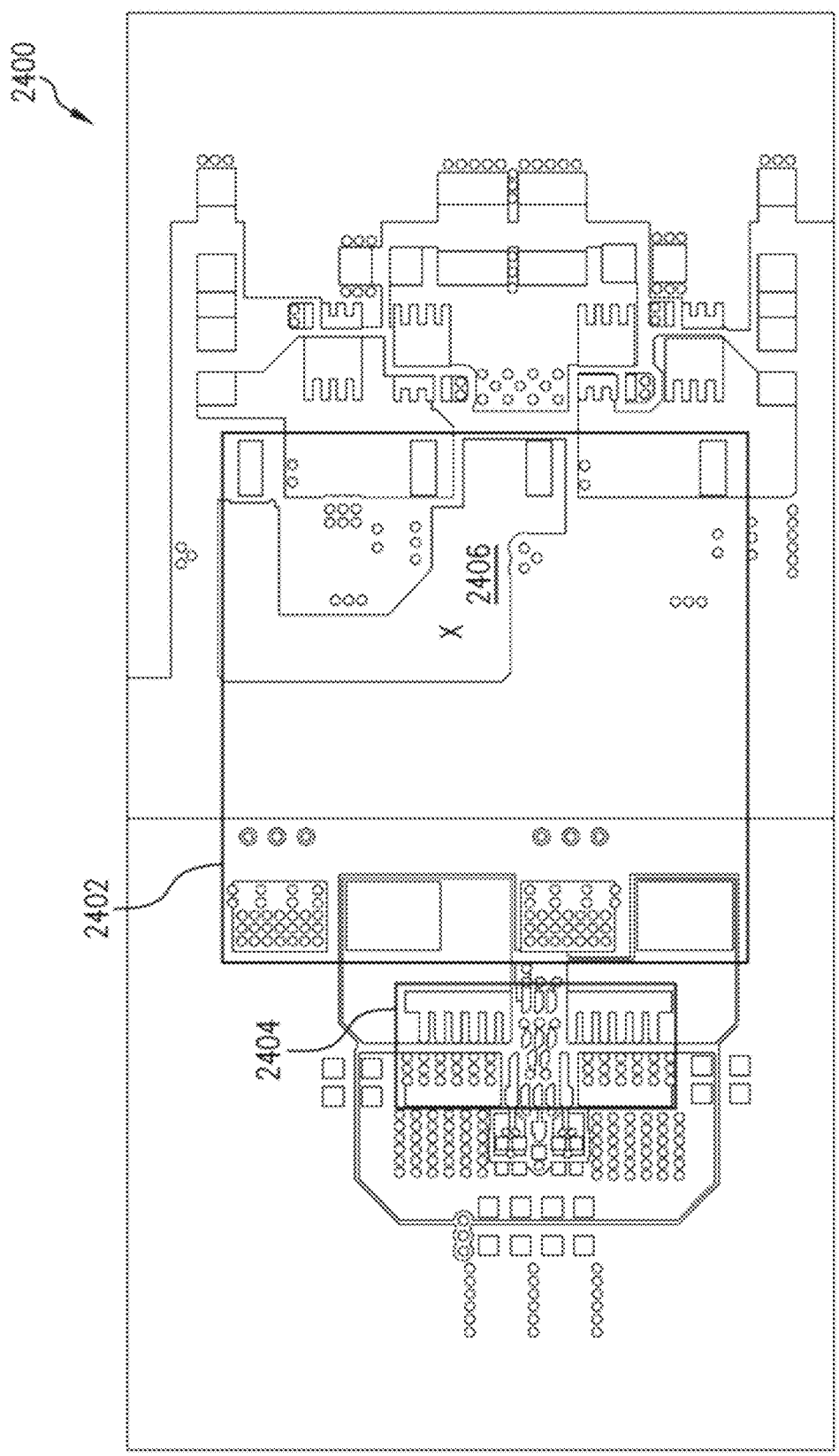
FIG. 24 illustrates one possible printed circuit board layout of a switching power converter similar to that of FIG. 18, according to an embodiment.

FIG. 24 illustrates one possible PCB layout 2400 of a switching power converter similar to that of FIG. 18. Box 2402 represents the footprint of an integrated magnetic device similar to integrated magnetic device 300, and box 2404 represents the footprint of a slave controller similar to slave controller 1816. In this embodiment, the first and second primary windings of the integrated magnetic device are electrically coupled in series external to the integrated magnetic device by a PCB conductive polygon 2406.

It should be appreciated that switching power converter 1800 can be physically configured in a manner different from that illustrated herein without departing from the scope hereof. For example, one or both of master controller 1814 and slave controller 1816 could be disposed in a different location relative to integrated magnetic device 300. Additionally, the division of functionality between master controller and 1814 and slave controller 1816 could be varied. For example, control of first and second rectification devices 1846 and 1848 could be moved from master controller 1814 to slave controller 1816. Furthermore, master controller 1814 and slave controller 1816 could be combined into a single controller without departing from the scope hereof. Moreover, one or more of master controller 1814 and slave controller 1816 could be partially or completely implemented by discrete components, instead of by an integrated circuit.

Figure 25:
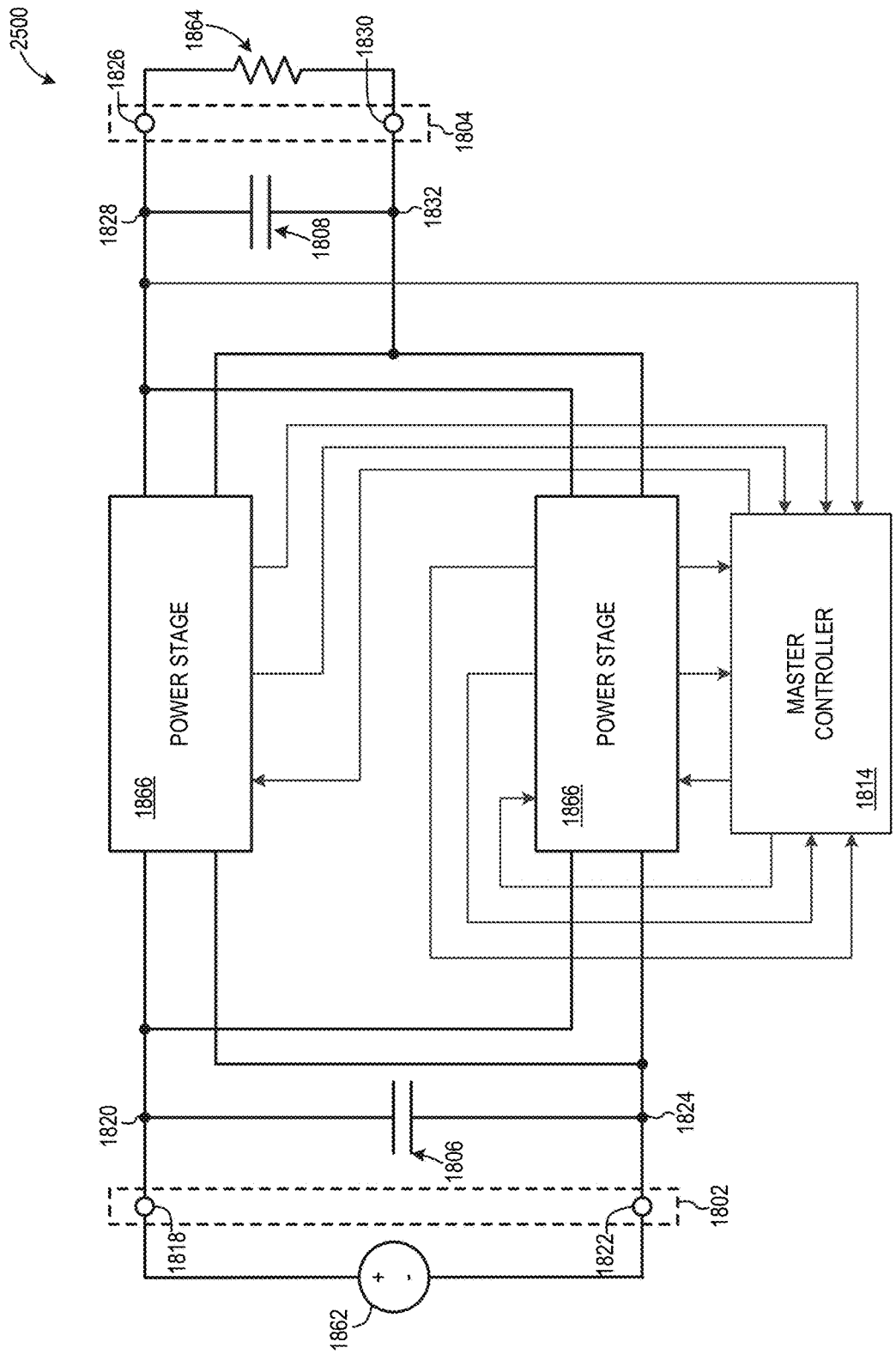
FIG. 25 illustrates a switching power converter like that of FIG. 18, but including two power stages electrically coupled in parallel, according to an embodiment.
Figure 26:
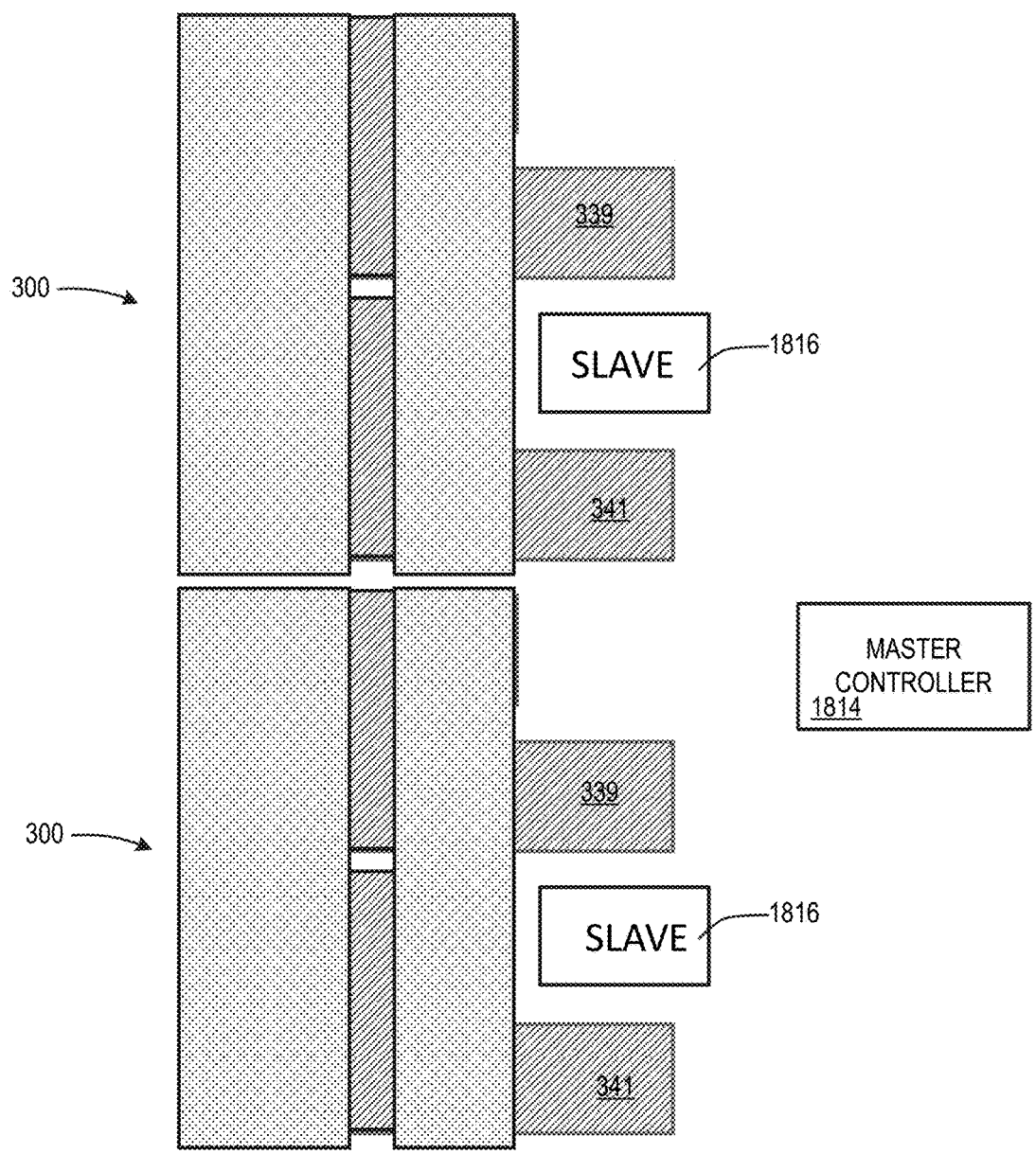
FIG. 26 is a top plan view of one possible layout of the FIG. 25 switching power converter.

First primary switching circuit 1810, second primary switching circuit 1812, slave controller 1816, and integrated magnetic device 300 form a power stage 1866. Switching power converter 1800 could be scaled to include a plurality of power stages 1866 electrically coupled in parallel, such as to support large loads, without departing from the scope hereof. For example, FIG. 25 illustrates a switching power converter 2500, which is like switching power converter 1800 of FIG. 18, but with two power stages 1866 electrically coupled in parallel. Details of power stages 1866 are not shown in FIG. 25 to promote illustrative clarity. Both power stages 1866 are controlled by master controller 1814, which is optionally configured to switch power stages 1866 out-of-phase with respect to each other, to minimize ripple current. FIG. 26 is a top plan view of one possible layout of switching power converter 2500, where each of master controller 1814 and each slave controller 1816 are implemented in a respective integrated circuit. Input port 1802, output port 1804, input capacitor 1806, and output capacitor 1808 are not shown in FIG. 26 to promote illustrative clarity.

It is important to ensure that the transformer and coupled inductor of integrated magnetic device 300 do not magnetically saturate in switching power converter 1800, to prevent improper operation and possible damage to the switching power converter and/or external circuitry. Potential for magnetic saturation may be particularly acute in applications where switching power converter 1800 is powering a high frequency transient load, such as a microprocessor or electronic memory drawing current with a significant AC component.

As discussed above with respect to FIG. 1, conventional secondary-side current mode control will not prevent the transformer in a current doubler from saturating, and a primary-side blocking capacitor cannot be used with fast secondary-side current mode control. However, Applicant has developed new secondary-side current mode control techniques which are capable of preventing a transformer from saturating in a current doubler, thereby enabling use of cycle-by-cycle secondary-side current mode control in a current doubler. In secondary-side current mode control, the switching converter is controlled at least partially based on current flowing through the secondary windings, thereby enabling direct control of the switching converter based on load current. Consequentially, secondary-side current mode control promotes fast transient response, or in other words, the ability to quickly respond to a load change. Secondary-side current mode control also facilitates obtaining a predetermined output voltage-current characteristic or "load line," where output voltage magnitude is a function of output current magnitude. Furthermore, secondary-side current mode control facilitates balancing and limiting magnitude of current through the secondary windings.

Figure 27:
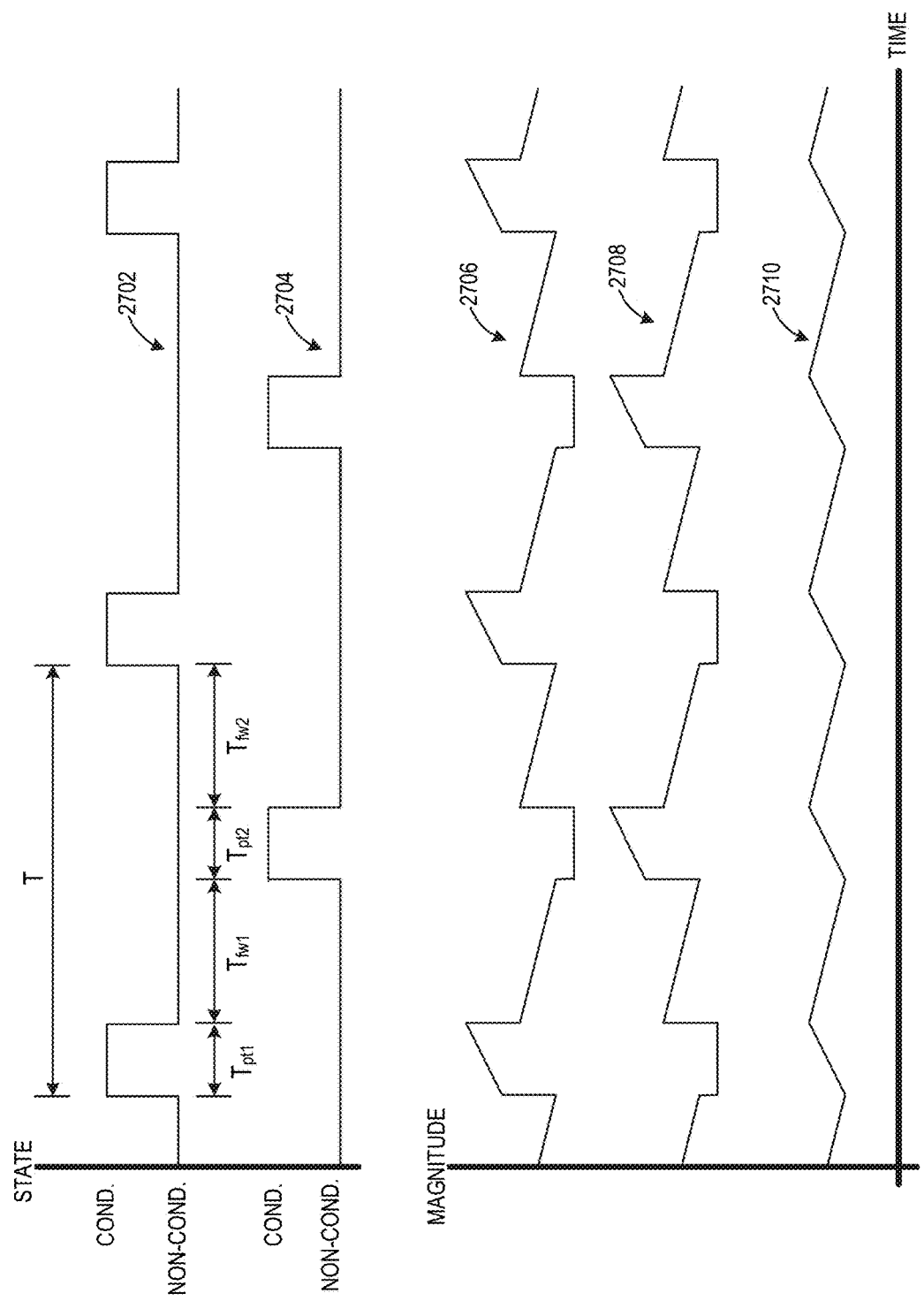
FIG. 27 illustrates exemplary waveforms of an embodiment of the FIG. 18 switching power converter.

FIG. 27 illustrates exemplary waveforms of an embodiment of switching power converter 1800 implementing these new secondary-side current mode control techniques. FIGS. 18 and 27 are best viewed together in the following description. It should be appreciated, however, the switching power converter 1800 could alternately implement a different control technique without departing from the scope hereof.

Curve 2702 represents the operating state (i.e., conductive or non-conductive) of first upper switching device 1834 and second lower switching device 1842, and curve 2704 represents the operating state (i.e., conductive or non-conductive) of first lower switching device 1836 and second upper switching device 1840. Curve 2706 represents current through first rectification device 1846, curve 2708 represents current through second rectification device 1848, and curve 2710 represents sum 1868 of current through both first and second rectification devices 1846 and 1848. Switching power converter 1800 has a switching period or cycle T including first and second power transfer periods $T_{pt1}$ and $T_{pt2}$ and first and second freewheeling periods $T_{fw1}$ and $T_{fw2}$. First primary switching circuit 1810 operates in its high-state and second primary switching circuit 1812 operates in its low-state during first power transfer period $T_{pt1}$. Conversely, second primary switching circuit 1812 operates in its high-state and first primary switching circuit 1810 operates in its low-state during second power transfer period $T_{pt2}$. Both first and second primary switching circuits 1810 and 1812 operate in their off-states during freewheeling periods $T_{fw1}$ and $T_{fw2}$.

It should be appreciated that each primary switching circuit 1810 and 1812 transitions from its high-state to its low-state with the secondary side of integrated magnetic device 300 constrained, i.e., one of rectification devices 1846 and 1848 is operating in its conductive state at the time of the transition. This feature allows transfer of magnetizing current from primary windings 310 and 312 to secondary windings 314 and 316, thereby enabling determination of magnetizing current from secondary-side current information, as discussed below.

Master controller 1814 controls operation of first and second primary switching circuits 1810 and 1812 so that magnitude of current through first rectification device 1846 during first power transfer period $T_{pt1}$ equals magnitude of current through second rectification device 1848 during second power transfer period $T_{pt2}$, thereby balancing current through the rectifications devices as well as current through first and second secondary windings 314 and 316. For example, in some embodiments, master controller 1814 controls operation of first and second primary switching circuits 1810 and 1812 to ensure that peak magnitude of current through first rectification device 1846 during first power transfer period $T_{pt1}$ is the same as peak magnitude of current through second rectification device 1848 during second power transfer period $T_{pt2}$, thereby implementing peak current mode control. As another example, in some other embodiments, master controller 1814 controls operation of first and second primary switching circuits 1810 and 1812 to ensure that the minimum magnitude of current through first rectification device 1846 during first power transfer period $T_{pt1}$ is the same as the minimum magnitude of current through second rectification device 1848 during second power transfer period $T_{pt2}$, thereby implementing valley current mode control. Other control schemes could alternately be used to balance current through first and second rectification devices 1846 and 1848 during first and second power transfer periods $T_{pt1}$ and $T_{pt2}$ without departing from the scope hereof.

Master controller 1814 additionally identifies magnetizing flux from a difference in current through first rectification device 1846 and current through second rectification device 1848 during freewheeling periods. Master controller 1814 further adjusts switching of first and second primary switching circuits 1810 and 1812, as needed, to minimize the magnetizing flux, thereby preventing saturation of integrated magnetic device 300.

In particular, transformer magnetizing current of integrated magnetic device 300 will flow through first and second primary windings 310 and 312 during first and second power transfer periods $T_{pt1}$ and $T_{pt2}$. During freewheeling periods $T_{fw1}$ and $T_{fw2}$, in contrast, the transformer magnetizing current will flow through first and second secondary windings 314 and 316. The magnetizing current is shorted by first and second secondary windings 314 and 316 and first and second rectification devices 1846 and 1848 during freewheeling periods $T_{fw1}$ and $T_{fw2}$. The amplitude of the magnetizing current will therefore remain largely unchanged during the freewheeling periods due to first and second secondary windings 314 and 316 and first and second rectification devices 1846 and 1848 having a relatively low resistance.

Current through first rectification device 1846 is defined as follows during first freewheeling period $T_{fw1}$, where $I_{rd1}$ is current through first rectification device 1846, $I_{L1}$ is current associated with leakage inductance of first secondary winding 314, and $I_{m1}$ is magnetizing current of magnetic device 300 flowing through first secondary winding 314:

$$I_{rd1} = I_{L1} + I_{m1} \quad \text{EQN. 1}$$

Similarly, current through second rectification device 1848 is defined as follows during first freewheeling period $T_{fw1}$, where $I_{rd2}$ is current through second rectification device 1848, $I_{L2}$ is current associated with leakage inductance of second secondary winding 316, and $I_{m2}$ is magnetizing current of magnetic device 300 flowing through second secondary winding 316:

$$I_{rd2} = I_{L2} - I_{m2} \quad \text{EQN. 2}$$

Magnitude of magnetizing current $I_{m1}$ will be the same as magnitude of magnetizing current $I_{m2}$ assuming symmetrical conditions. Accordingly, the difference between current through first rectification device 1846 and second rectification device 1848 during first freewheeling period $T_{fw1}$ can be defined as follows:

$$I_{rd1} - I_{rd2} = I_{L1} - I_{L2} + 2I_{m1} \quad \text{EQN. 3}$$

EQN. 3 can be rearranged to yield the following equation defining magnetizing current $I_{m1}$ during first freewheeling period $T_{fw1}$:

$$I_{m1} = [(I_{rd1} - I_{rd2}) - (I_{L1} - I_{L2})]/2 \quad \text{EQN. 4}$$

The quantity $I_{L1} - I_{L2}$ will typically be very small because master controller 1814 controls operation of first and second primary switching circuits 1810 and 1812 so that magnitude of current through first rectification device 1846 during first power transfer period $T_{pt1}$ equals magnitude of current through second rectification device 1848 during second power transfer period $T_{pt2}$, as discussed above. Therefore, magnetizing current during first freewheeling period $T_{fw1}$ can be approximated as follows:

$$I_{m1} \approx (I_{rd1} - I_{rd2})/2 \quad \text{EQN. 5}$$

Thus, magnitude of magnetizing current at the end of first power transfer period $T_{pt1}$ can be approximated from the difference between magnitude of current through first and second rectification devices 1846 and 1848 during first freewheeling period $T_{fw1}$. Similarly, it can be shown that magnetizing current at the end of second power transfer period $T_{pt2}$ can be approximated from the difference between magnitude of current through first and second rectification devices 1846 and 1848 during second freewheeling period $T_{fw2}$.

Figure 28:
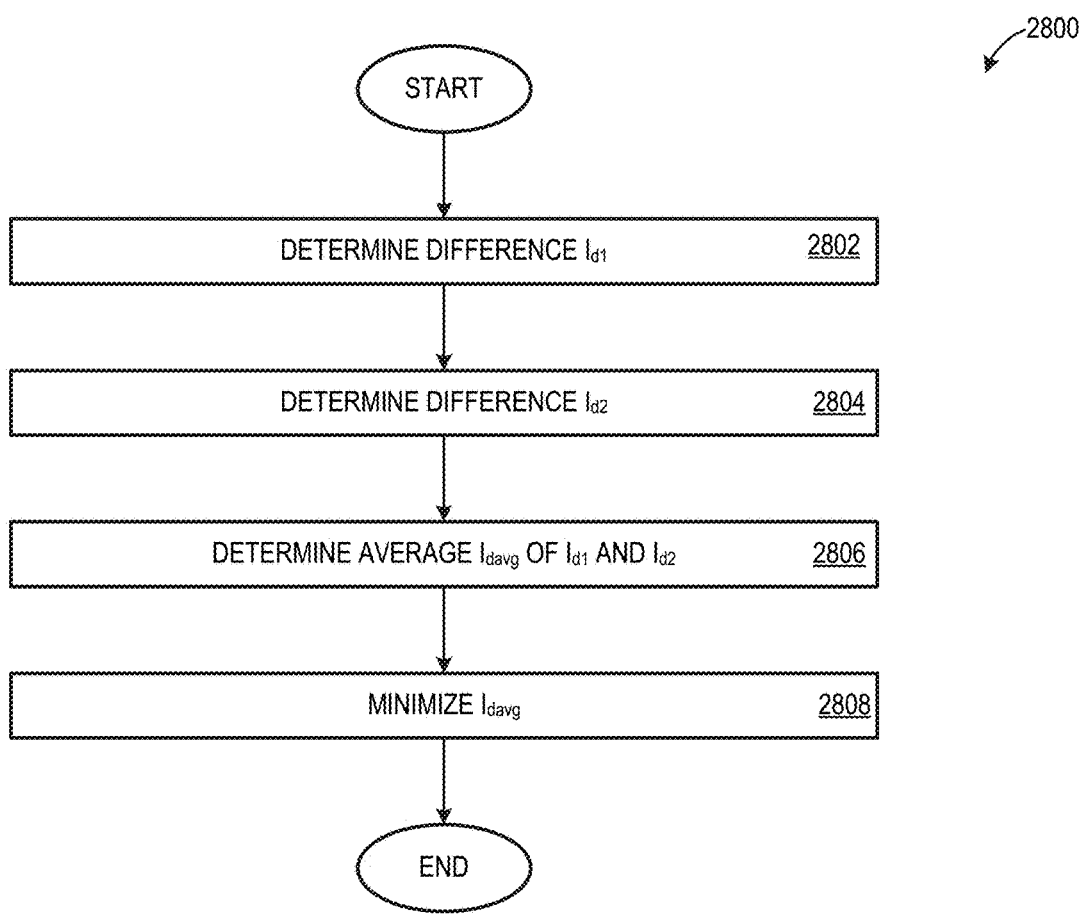
FIG. 28 illustrates a method for preventing magnetic saturation of a transformer using secondary-side current information, according to an embodiment.

Accordingly, in certain embodiments of switching power converter 1800, master controller 1814 performs method 2800, illustrated in FIG. 28, for preventing magnetic saturation of a transformer using secondary-side current information. In step 2802 of method 2800, master controller 1814 determines a difference $I_{d1}$ between magnitude of current through first and second rectification devices 1846 and 1848 during first freewheeling period $T_{fw1}$. As discussed above, magnitude of current through first and second rectification devices 1846 and 1848 is the same as current through first and second secondary windings 314 and 316, respectively. Difference $I_{d1}$ is optionally scaled in step 2802. In one example of step 2802, master controller 1814 determines difference $I_{d1}$ from first current sense signal 1854 and second current sense signal 1856 a predetermined time within first freewheeling period $T_{fw1}$.

In step 2804 of method 2800, master controller 1814 determines a difference $I_{d2}$ between magnitude of current through first and second rectification devices 1846 and 1848 during second freewheeling period $T_{fw2}$. Difference $I_{d2}$ is optionally scaled in step 2804. In one example of step 2804, master controller 1814 determines difference $I_{d2}$ from first current sense signal 1854 and second current sense signal 1856 a predetermined time within second freewheeling period $T_{fw2}$ corresponding to the predetermined time within first freewheeling period $T_{fw1}$ of step 2802.

Magnitude of magnetizing current $I_m$ will sometimes slightly differ between first freewheeling period $T_{fw1}$ and second freewheeling period $T_{fw2}$, resulting in a small ripple component in the magnetizing current. Consequentially, in step 2806, master controller 1814 determines an average current $I_{davg}$ of $I_{d1}$ and $I_{d2}$, to eliminate the effect of the ripple component when controlling magnitude of magnetizing current $I_m$. Average current $I_{davg}$ is optionally scaled in step 2806. In one example of step 2806, master controller 1804 adds $I_{d2}$ and $I_{d1}$ to yield average current $I_{davg}$.

Average current $I_{davg}$ is proportional to magnetizing flux in integrated magnetic device 300. Therefore, in step 2808, master controller 1814 adjusts switching of first primary switching circuit 1810 and/or switching of second primary switching circuit 1812 to minimize magnitude of average current $I_{davg}$, thereby minimizing magnetizing flux and preventing magnetic saturation of integrated magnetic device 300. In one example of step 2808, master controller 1814 adjusts duty cycle of first primary switching circuit 1810 and/or duty cycle of second primary switching circuit 1812 to minimize magnitude of average current $I_{davg}$. Duty cycle of first primary switching circuit 1810 is the ratio of first power transfer period $T_{pt1}$ to period T, while duty cycle of second primary switching circuit 1812 is the ratio of second power transfer period $T_{pt2}$ to period T.

Method 2800 is repeated, for example, for each cycle T or for every M cycles T, where M is an integer greater than one. It should be appreciated that method 2800 could be used with other current doublers having an integrated transformer and coupled inductor without departing from the scope hereof.

Applicant has further discovered that use of fixed on-time control with cycle-by-cycle secondary-side current mode control advantageously promotes robust control of a current doubler during transient load events. In particular, fixed on-time control helps ensure that magnetizing current does not vary between power transfer periods $T_{pt1}$ and $T_{pt2}$, even if load current magnitude or other operating conditions change, thereby facilitating stable operation of the current doubler. In contrast, other control schemes will cause magnetizing current magnitude to change as load current changes, thereby complicating current doubler control and possibly leading to unreliable operation during transient load events. For example, large changes in magnetizing current due to transient load events may make it difficult to implement method 2800 for preventing magnetic saturation, discussed above with respect to FIG. 28.

Accordingly, in some embodiments of switching power converter 1800, master controller 1814 implements fixed on-time control, which is characterized by both power transfer periods $T_{pt1}$ and $T_{pt2}$ having a fixed duration for N consecutive switching cycles T, where N is an integer greater than one, such as illustrated in FIG. 27. Regulation is achieved, for example, by slowly changing the duration of power transfer periods $T_{pt1}$ and $T_{pt2}$, such that the duration changes much slower than the switching frequency (1/T) of switching power converter 1800.

Combinations of Features

Features described above may be combined in various ways without departing from the scope hereof. The following examples illustrate some possible combinations:

(A1) An integrated transformer and coupled inductor having length, width, and height may include a magnetic core, first and second primary windings, and first and second secondary windings. The magnetic core may include (1) first and second rails separated from each other in a widthwise direction, (2) first and second rungs, where each rung is disposed between the first and second rails in the widthwise direction, and (3) a leakage plate disposed between the first and second rails in the widthwise direction, where the leakage plate is disposed over each of the first and second rungs in the height direction. Each of the first and second rails may completely surround each of the first and second rungs, as seen when the magnetic core is viewed cross-sectionally in the widthwise direction. The first primary winding may be wound around the first rung, and the second primary winding may be wound around the second rung. The first secondary winding may be wound around the first rung, and the second secondary winding may be wound around the second rung.

(A2) In the integrated transformer and coupled inductor denoted as (A1), the second primary winding may be electrically coupled in series with the first primary winding.

(A3) In either of the integrated transformers and coupled inductors denoted as (A1) or (A2), the first primary winding and the first secondary winding may be concentric, and the second primary winding and the second secondary winding may be concentric.

(A4) In any of the integrated transformers and coupled inductors denoted as (A1) through (A3), the integrated transformer and coupled inductor may form a bottom outer surface in the lengthwise and widthwise directions for mounting on a substrate, and each of the first primary winding, the second primary winding, the first secondary winding, and the second secondary winding may extend to the bottom outer surface.

(A5) In any of the integrated transformers and coupled inductors denoted as (A1) through (A4), the first rung may have a first center axis extending in the widthwise direction, and the second rung may have a second center axis extending in the widthwise direction. The first primary winding may include a first and a second portion, where the first secondary winding is disposed between the first and second portions of the first primary winding in a radial direction relative to the first center axis. The second primary winding may include a first and a second portion, where the second secondary winding is disposed between the first and second portions of the second primary winding in a radial direction relative to the second center axis.

(A6) In any of the integrated transformers and coupled inductors denoted as (A1) through (A5), the first and second primary windings each may be multi-filar windings, and the first and second secondary windings each may be foil windings.

(A7) Any of the integrated transformers and coupled inductors denoted as (A1) through (A6) may further include first insulating material disposed between the first primary winding and the first secondary winding and second insulating material disposed between the second primary winding and the second secondary winding.

(A8) In any of the integrated transformers and coupled inductors denoted as (A1) through (A7), a coupling magnetic flux path in the magnetic core may be substantially orthogonal to a leakage magnetic flux path in the magnetic core.

(A9) In any of the integrated transformers and coupled inductors denoted as (A1) through (A8), the leakage plate may be separated from one of the first and second rails by a leakage gap filled with gap material, where the gap material has a lower magnetic permeability than a magnetic material forming the leakage plate. The gap material may be air.

(A10) In any of the integrated transformers and coupled inductors denoted as (A1) through (A9), the first rail and the leakage plate may collectively form a first monolithic magnetic element separate from the first and second rungs.

(B1) A switching power converter may include an integrated transformer and coupled inductor, first and second primary switching circuits, and a master controller. The integrated transformer and coupled inductor may include (1) first and second primary windings and (2) first and second secondary windings. The first and second primary windings may be electrically coupled in series. The first primary switching circuit may be electrically coupled to an end of the first primary winding, and the second primary switching circuit may be electrically coupled to an end of the second primary winding. The master controller may be configured to control each of the first and second primary switching circuits such that each switching cycle of the switching power converter includes a first power transfer period, a first freewheeling period, a second power transfer period, and a second freewheeling period. The master controller may be further configured to control each of the first and second primary switching circuits such that a duration of each first power transfer period and each second power transfer period is fixed for at least N consecutive switching cycles of the switching power converter, where N is an integer greater than one.

(B2) In the switching power converter denoted as (B1), the master controller may be further configured to control each of the first and second primary switching circuits such that (1) the first primary switching circuit operates in a respective high-state and the second primary switching circuit operates in a respective low-state during the first power transfer period, (2) the first primary switching circuit operates in a respective low-state and the second primary switching circuit operates in a respective high-state during the second power transfer period, and (3) each of the first and second primary switching circuits operates in its respective off-state during each of the first and second freewheeling periods.

(B3) In either of the switching power converters denoted as (B1) or (B2), the master controller may be configured to control switching of the first primary switching circuit based at least in part on a magnitude of current flowing through the first secondary winding, and the master controller may be configured to control switching of the second primary switching circuit based at least in part on a magnitude of current flowing through the second secondary winding.

(B4) Any of the switching power converters denoted as (B1) through (B3) may further include a slave controller communicatively coupled with the master controller. The slave controller may include (1) an integrated circuit package, (2) a first rectification device disposed in the integrated circuit package, where the first rectification device is electrically coupled to an end of the first secondary winding, (3) a second rectification device disposed in the integrated circuit package, where the second rectification device is electrically coupled to an end of the second secondary winding, (4) first current sense circuitry configured to determine the magnitude of current flowing through the first secondary winding, and (4) second current sense circuitry configured to determine the magnitude of current flowing through the second secondary winding.

(B5) In the switching power converter denoted as (B4), each of the first and second rectification devices may include a respective switching device.

(B6) In either of the switching power converters denoted as (B4) or (B5), the master controller may be configured to determine a magnitude of magnetizing current of the integrated transformer and coupled inductor from a difference between magnitude of current flowing through the first rectification device and magnitude of current flowing through the second rectification device, when the first and second primary switching circuits are in their respective off-states.

(B7) In any of the switching power converters denoted as (B1) through (B6), the master controller may be configured to determine a magnitude of magnetizing current of the integrated transformer and coupled inductor from a difference between magnitude of current flowing through the first secondary winding and magnitude of current flowing through the second secondary winding, when the first and second primary switching circuits are both in their respective off-states.

(B8) In any of the switching power converters denoted as (B1) through (B7), the switching power converter may have a current doubler topology.

(B9) In any of the switching power converters denoted as (B1) through (B8), (1) the integrated transformer and coupled inductor may have length, width, and height; (2) the integrated transformer and coupled inductor may include a magnetic core including (i) first and second rails separated from each other in a widthwise direction, (ii) first and second rungs, where each rung is disposed between the first and second rails in the widthwise direction, and (iii) a leakage plate disposed between the first and second rails in the widthwise direction, the leakage plate being disposed over each of the first and second rungs in the height direction; (3) the first primary winding and the first secondary winding may be wound around the first rung; and (4) the second primary winding and the second secondary winding may be wound around the second rung.

(B10) In the switching power converter denoted as (B9), the first primary winding and the first secondary winding may be concentric, and the second primary winding and the second secondary winding may be concentric.

(B11) In either of the switching power converters denoted as (B9) or (B10), each of the first and second rails may completely surround each of the first and second rungs, as seen when the magnetic core is viewed cross-sectionally in the widthwise direction.

(B12) In any of the switching power converters denoted as (B9) through (B11), (1) the first rung may have a first center axis extending in the widthwise direction, (2) the first primary winding may include a first and a second portion, where the first secondary winding is disposed between the first and second portions of the first primary winding in a radial direction relative to the first center axis, (3) the second rung may have a second center axis extending in the widthwise direction, and (4) the second primary winding may include a first and a second portion, where the second secondary winding is disposed between the first and second portions of the second primary winding in a radial direction relative to the second center axis.

(B13) In any of the switching power converters denoted as (B9) through (B12), the first and second primary windings each may be multi-filar windings, and the first and second secondary windings each may be foil windings.

(B14) In any of the switching power converters denoted as (B9) through (B13), first insulating material may be disposed between the first primary winding and the first secondary winding, and second insulating material may be disposed between the second primary winding and the second secondary winding.

(B15) In any of the switching power converters denoted as (B9) through (B14), a coupling magnetic flux path in the magnetic core may be substantially orthogonal to a leakage magnetic flux path in the magnetic core.

(B16) In any of the switching power converters denoted as (B9) through (B15), the leakage plate may be separated from one of the first and second rails by a leakage gap filled with gap material, where the gap material has a lower magnetic permeability than a magnetic material forming the leakage plate. The gap material may be air.

(C1) A switching power converter may include an integrated transformer and coupled inductor, first and second primary switching circuits, and a master controller. The integrated transformer and coupled inductor may include (1) first and second primary windings and (2) first and second secondary windings. The first and second primary windings may be electrically coupled in series. The first primary switching circuit may be electrically coupled to an end of the first primary winding. The second primary switching circuit may be electrically coupled to an end of the second primary winding. The master controller may be configured to determine a magnitude of magnetizing current of the integrated transformer and coupled inductor from a difference between magnitude of current flowing through the first secondary winding and magnitude of current flowing through the second secondary winding, when the first and second primary switching circuits are both in respective off-states.

(C2) The switching power converters denoted as (C1) may further include a slave controller communicatively coupled with the master controller. The slave controller may include (1) an integrated circuit package, (2) a first rectification device disposed in the integrated circuit package, where the first rectification device is electrically coupled to an end of the first secondary winding, (3) a second rectification device disposed in the integrated circuit package, where the second rectification device is electrically coupled to an end of the second secondary winding, (4) first current sense circuitry configured to determine the magnitude of current flowing through the first secondary winding, and (4) second current sense circuitry configured to determine the magnitude of current flowing through the second secondary winding.

(C3) In the switching power converter denoted as (C2), each of the first and second rectification devices may include a respective switching device.

(C4) In any of the switching power converters denoted as (C1) through (C3), the switching power converter may have a current doubler topology.

(C5) In any of the switching power converters denoted as (C1) through (C4), (1) the integrated transformer and coupled inductor may have length, width, and height; (2) the integrated transformer and coupled inductor may include a magnetic core including (i) first and second rails separated from each other in a widthwise direction, (ii) first and second rungs, where each rung is disposed between the first and second rails in the widthwise direction, and (iii) a leakage plate disposed between the first and second rails in the widthwise direction, the leakage plate being disposed over each of the first and second rungs in the height direction; (3) the first primary winding and the first secondary winding may be wound around the first rung; and (4) the second primary winding and the second secondary winding may be wound around the second rung.

(C6) In the switching power converter denoted as (C5), the first primary winding and the first secondary winding may be concentric, and the second primary winding and the second secondary winding may be concentric.

(C7) In either of the switching power converters denoted as (C5) or (C6), each of the first and second rails may completely surround each of the first and second rungs, as seen when the magnetic core is viewed cross-sectionally in the widthwise direction.

(C8) In any of the switching power converters denoted as (C5) through (C7), (1) the first rung may have a first center axis extending in the widthwise direction, (2) the first primary winding may include a first and a second portion, where the first secondary winding is disposed between the first and second portions of the first primary winding in a radial direction relative to the first center axis, (3) the second rung may have a second center axis extending in the widthwise direction, and (4) the second primary winding may include a first and a second portion, where the second secondary winding is disposed between the first and second portions of the second primary winding in a radial direction relative to the second center axis.

(C9) In any of the switching power converters denoted as (C5) through (C8), the first and second primary windings each may be multi-filar windings, and the first and second secondary windings each may be foil windings.

(C10) In any of the switching power converters denoted as (C5) through (C9), first insulating material may be disposed between the first primary winding and the first secondary winding, and second insulating material may be disposed between the second primary winding and the second secondary winding.

(C11) In any of the switching power converters denoted as (C5) through (C10), a coupling magnetic flux path in the magnetic core may be substantially orthogonal to a leakage magnetic flux path in the magnetic core.

(C12) In any of the switching power converters denoted as (C5) through (C11), the leakage plate may be separated from one of the first and second rails by a leakage gap filled with gap material, where the gap material has a lower magnetic permeability than a magnetic material forming the leakage plate. The gap material may be air.

Changes may be made in the above devices, methods, and systems without departing from the scope hereof. It should thus be noted that the matter contained in the above description and shown in the accompanying drawings should be interpreted as illustrative and not in a limiting sense.

What is claimed is:

1. An integrated transformer and coupled inductor having length, width, and height, comprising:
    a magnetic core, including:
        first and second rails separated from each other in a widthwise direction,
        first and second rungs, each rung disposed between the first and second rails in the widthwise direction, and
        a leakage plate disposed between the first and second rails in the widthwise direction, the leakage plate being disposed over each of the first and second rungs in the height direction,
        each of the first and second rails completely surrounding each of the first and second rungs, as seen when the magnetic core is viewed cross-sectionally in the widthwise direction;
    a first primary winding wound around the first rung;
    a second primary winding wound around the second rung;
    a first secondary winding wound around the first rung; and
    a second secondary winding wound around the second rung,
    the first primary winding and the first secondary winding being concentric,
    the second primary winding and the second secondary winding being concentric,
    the first and second primary windings each being a multi-filar winding, and the first and second secondary windings each being a foil winding,
    the first secondary winding being wound over the first primary winding, and
    the second secondary winding being wound over the second primary winding.

2. The integrated transformer and coupled inductor of claim 1, the integrated transformer and coupled inductor forming a bottom outer surface in a lengthwise direction and in the widthwise direction for mounting on a substrate, each of the first primary winding, the second primary winding, the first secondary winding, and the second secondary winding extending to the bottom outer surface.

3. The integrated transformer and coupled inductor of claim 1, the first rail and the leakage plate collectively forming a first monolithic magnetic element separate from the first and second rungs.

4. The integrated transformer and coupled inductor of claim 1, wherein:
    the first rung has a first center axis extending in the widthwise direction;
    the first primary winding comprises a first and a second portion, the first secondary winding being disposed between the first and second portions of the first primary winding in a radial direction relative to the first center axis;
    the second rung has a second center axis extending in the widthwise direction; and
    the second primary winding comprises a first and a second portion, the second secondary winding being disposed between the first and second portions of the second primary winding in a radial direction relative to the second center axis.

5. The integrated transformer and coupled inductor of claim 1, further comprising:
    first insulating material disposed between the first primary winding and the first secondary winding; and
    second insulating material disposed between the second primary winding and the second secondary winding.

6. The integrated transformer and coupled inductor of claim 1, a coupling magnetic flux path in the magnetic core being substantially orthogonal to a leakage magnetic flux path in the magnetic core.

7. The integrated transformer and coupled inductor of claim 1, the leakage plate being separated from one of the first and second rails by a leakage gap filled with gap material, the gap material having a lower magnetic permeability than a magnetic material forming the leakage plate.

8. The integrated transformer and coupled inductor of claim 7, the gap material being air.

9. The integrated transformer and coupled inductor of claim 1, the first and second primary windings being electrically coupled in series.

10. A switching power converter, comprising:
an integrated transformer and coupled inductor, including:
first and second primary windings electrically coupled in series, and
first and second secondary windings;
a first primary switching circuit electrically coupled to an end of the first primary winding;
a second primary switching circuit electrically coupled to an end of the second primary winding; and
a master controller configured to control each of the first and second primary switching circuits such that (a) each switching cycle of the switching power converter includes a first power transfer period, a first freewheeling period, a second power transfer period, and a second freewheeling period, and (b) a change in a duration of the first power transfer period and a change in a duration of the second power transfer period between two or more switching cycles of the switching power converter occurs at a rate that is slower than a rate of switching of the switching power converter, to regulate one or more parameters of the switching power converter.

11. The switching power converter of claim 10, the master controller being further configured to control each of the first and second primary switching circuits such that:
the first primary switching circuit operates in a respective high-state and the second primary switching circuit operates in a respective low-state during the first power transfer period;
the first primary switching circuit operates in a respective low-state and the second primary switching circuit operates in a respective high-state during the second power transfer period; and
each of the first and second primary switching circuits operates in a respective off-state during each of the first and second freewheeling periods.

12. The switching power converter of claim 10, wherein:
the master controller is configured to control switching of the first primary switching circuit based at least in part on a magnitude of current flowing through the first secondary winding; and
the master controller is configured to control switching of the second primary switching circuit based at least in part on a magnitude of current flowing through the second secondary winding.

13. The switching power converter of claim 10, further comprising a slave controller communicatively coupled with the master controller, the slave controller including:
an integrated circuit package,
a first rectification device disposed in the integrated circuit package, the first rectification device electrically coupled to an end of the first secondary winding;
a second rectification device disposed in the integrated circuit package, the second rectification device electrically coupled to an end of the second secondary winding;
first current sense circuitry configured to determine the magnitude of current flowing through the first secondary winding; and
second current sense circuitry configured to determine the magnitude of current flowing through the second secondary winding.

14. The switching power converter of claim 13, each of the first and second rectification devices comprising a respective switching device.

15. The switching power converter of claim 14, the switching power converter having a current doubler topology.

16. The switching power converter of claim 13, the master controller being configured to determine a magnitude of magnetizing current of the integrated transformer and coupled inductor from a difference between current flowing through the first rectification device and current flowing through the second rectification device, when the first and second primary switching circuits are both in their respective off-states.

17. The switching power converter of claim 10, the master controller being configured to determine a magnitude of magnetizing current of the integrated transformer and coupled inductor from a difference between current flowing through the first secondary winding and current flowing through the second secondary winding, when the first and second primary switching circuits are both in their respective off-states.

18. The switching power converter of claim 10, wherein:
the integrated transformer and coupled inductor has length, width, and height; and
the integrated transformer and coupled inductor comprises magnetic core including:
first and second rails separated from each other in a widthwise direction,
first and second rungs, each rung disposed between the first and second rails in the widthwise direction, and
a leakage plate disposed between the first and second rails in the widthwise direction, the leakage plate being disposed over each of the first and second rungs in the height direction,
the first primary winding and the first secondary winding are wound around the first rung, and
the second primary winding and the second secondary winding are wound around the second rung.

19. The switching power converter of claim 18, each of the first and second rails completely surrounding each of the first and second rungs, as seen when the magnetic core is viewed cross-sectionally in the widthwise direction.

* * * * *